United States Patent [19]

Inoue et al.

[11] Patent Number: 5,778,117
[45] Date of Patent: Jul. 7, 1998

[54] DEVICE FOR FAULT LOCALIZATION IN REPEATERLESS TRANSMISSION SYSTEM

[75] Inventors: Yoshiyuki Inoue; Takashi Miyazaki, both of Kawasaki, Japan

[73] Assignee: Fujitsu Limited, Kawasaki, Japan

[21] Appl. No.: 724,960

[22] Filed: Sep. 25, 1996

[30] Foreign Application Priority Data

Mar. 19, 1996 [JP] Japan .................................. 8-062663

[51] Int. Cl.⁶ ........................................................ G02B 6/28
[52] U.S. Cl. ............................ 385/24; 359/134; 359/160; 385/147; 372/6
[58] Field of Search ............................ 359/134, 160, 359/173; 372/6; 385/24, 15, 147

[56] References Cited

U.S. PATENT DOCUMENTS

| | | | |
|---|---|---|---|
| 5,185,826 | 2/1993 | Delavaux | 359/134 |
| 5,214,728 | 5/1993 | Shigematsu et al. | 385/24 |
| 5,542,011 | 7/1996 | Robinson | 372/6 |
| 5,555,118 | 9/1996 | Huber | 385/24 |
| 5,572,612 | 11/1996 | Delavaux et al. | 385/24 |
| 5,598,491 | 1/1997 | Ohya et al. | 385/24 |

FOREIGN PATENT DOCUMENTS 4-051620 2/1992 Japan.

*Primary Examiner*—John Ngo
*Attorney, Agent, or Firm*—Staas & Halsey

[57] ABSTRACT

A device is used for receiving input signal light and pump light from a first remote site through a first optical fiber and a second optical fiber, respectively, and for sending amplified signal light through a third optical fiber to a second remote site. The device includes an amplifier unit for amplifying the input signal light by using the pump light to transmit the amplified signal light to the third optical fiber, the amplifier unit having a prevention unit for preventing light coming back through the third optical fiber from entering the amplifier unit, and a path providing unit for providing a path inside the device, the path leading reflection light coming through the third optical fiber to a connection point of the device, the connection point having optical connection with the first remote site, wherein the reflection light is a light pulse for fault localization reflected at a fault point on the third optical fiber, the light pulse for fault localization sent to the third optical fiber from the first remote site via the device.

20 Claims, 19 Drawing Sheets

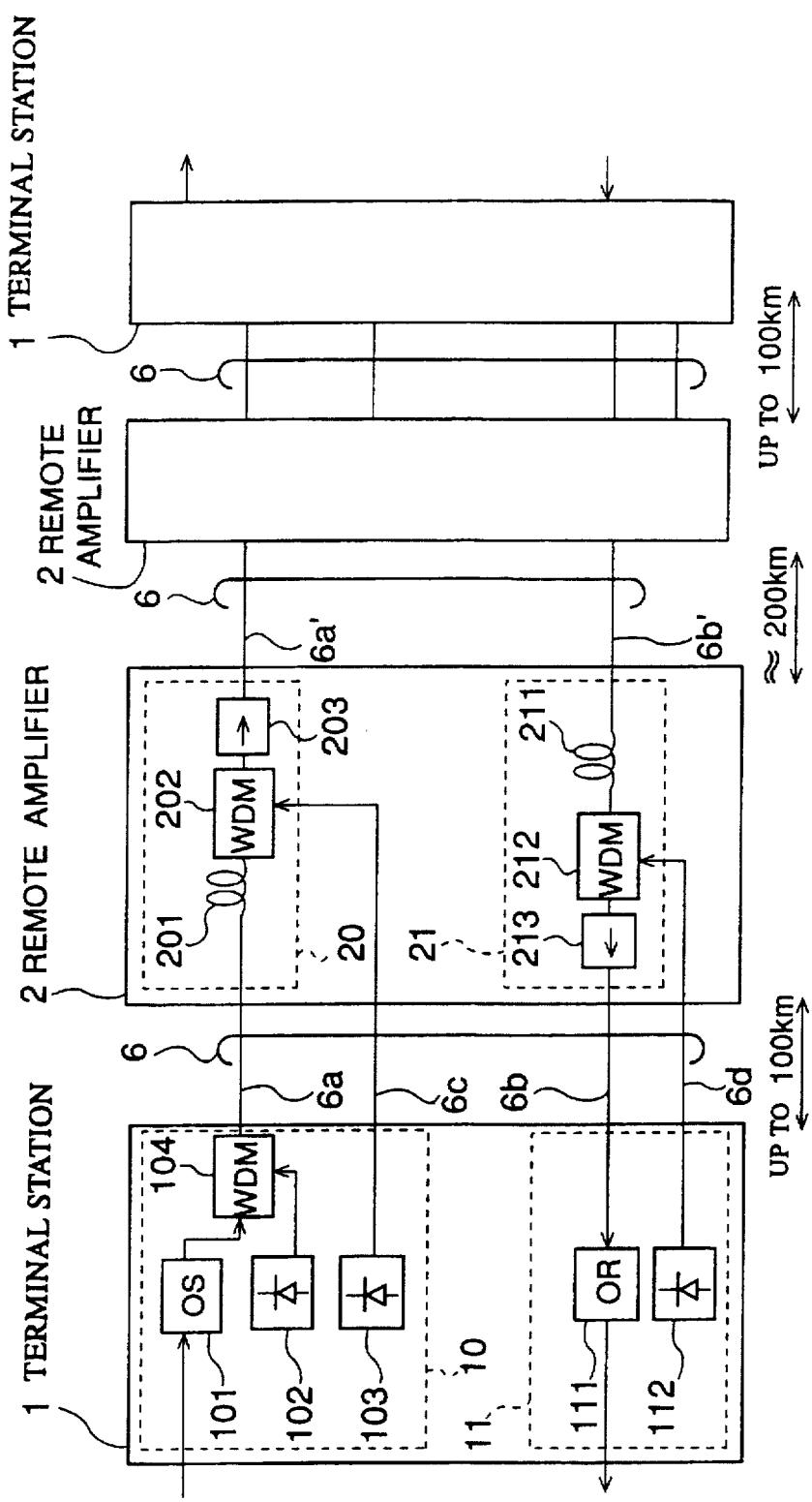

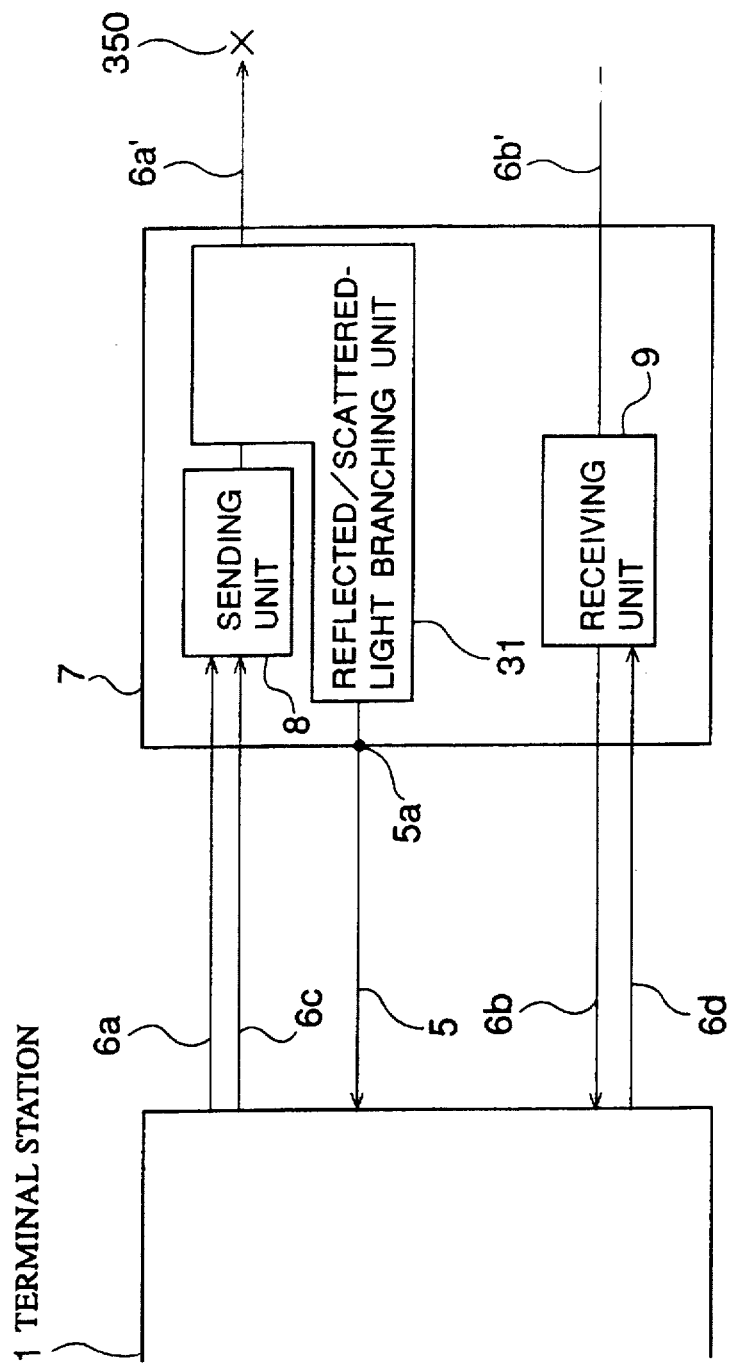

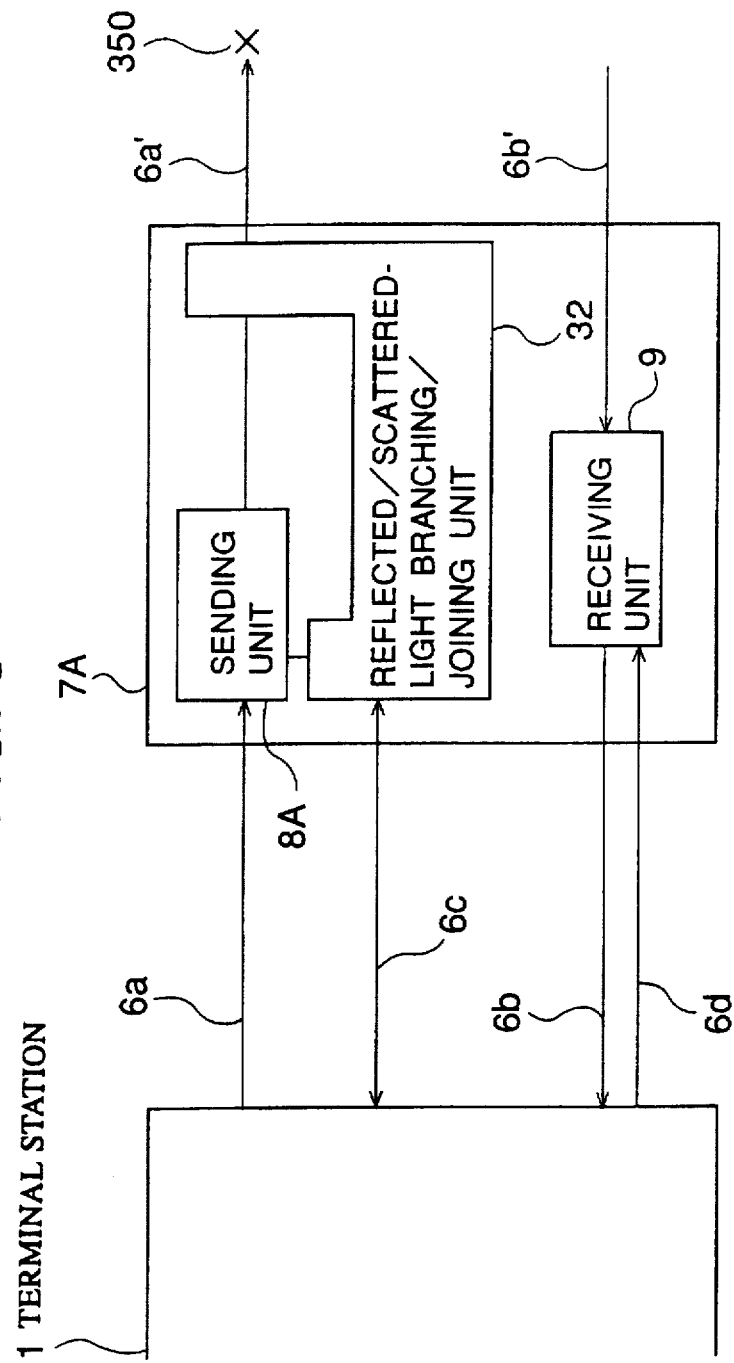

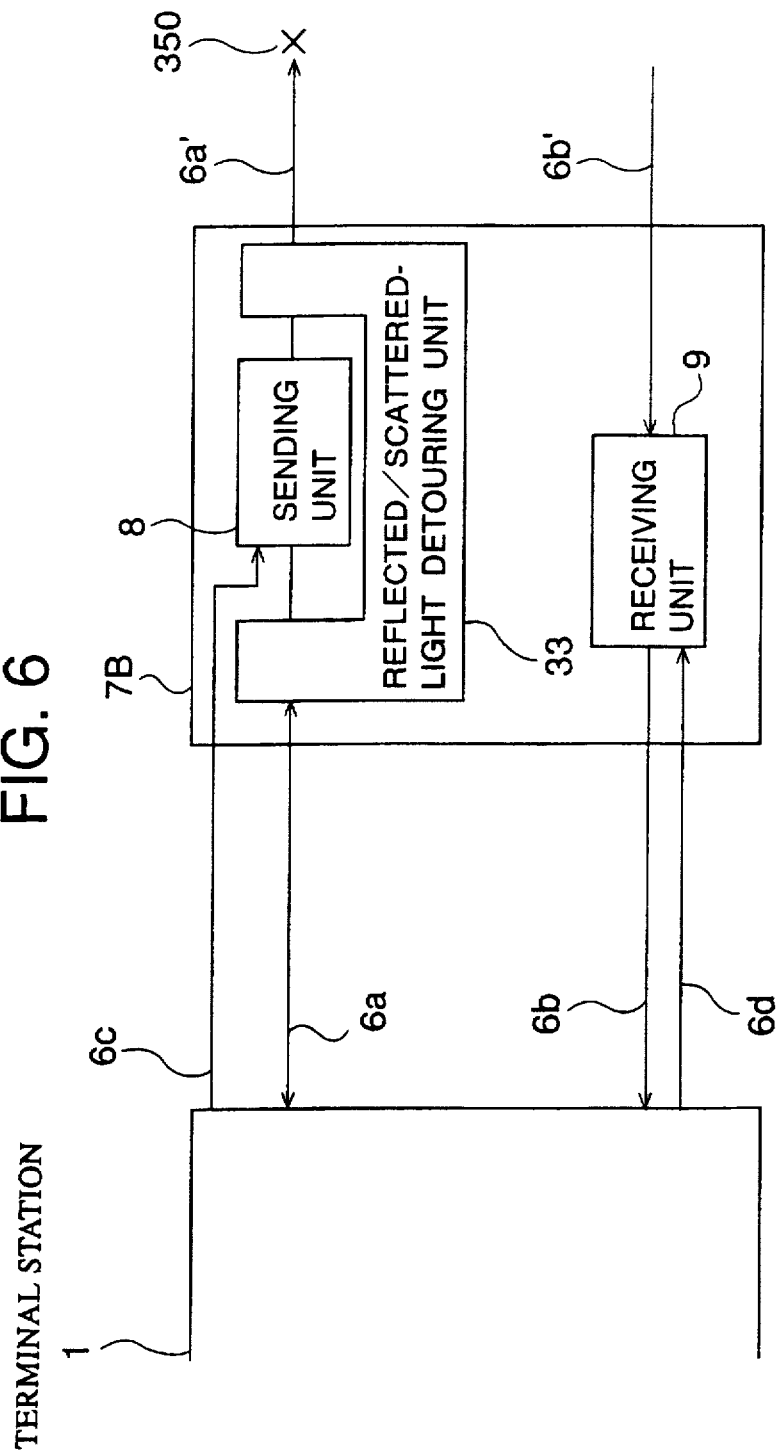

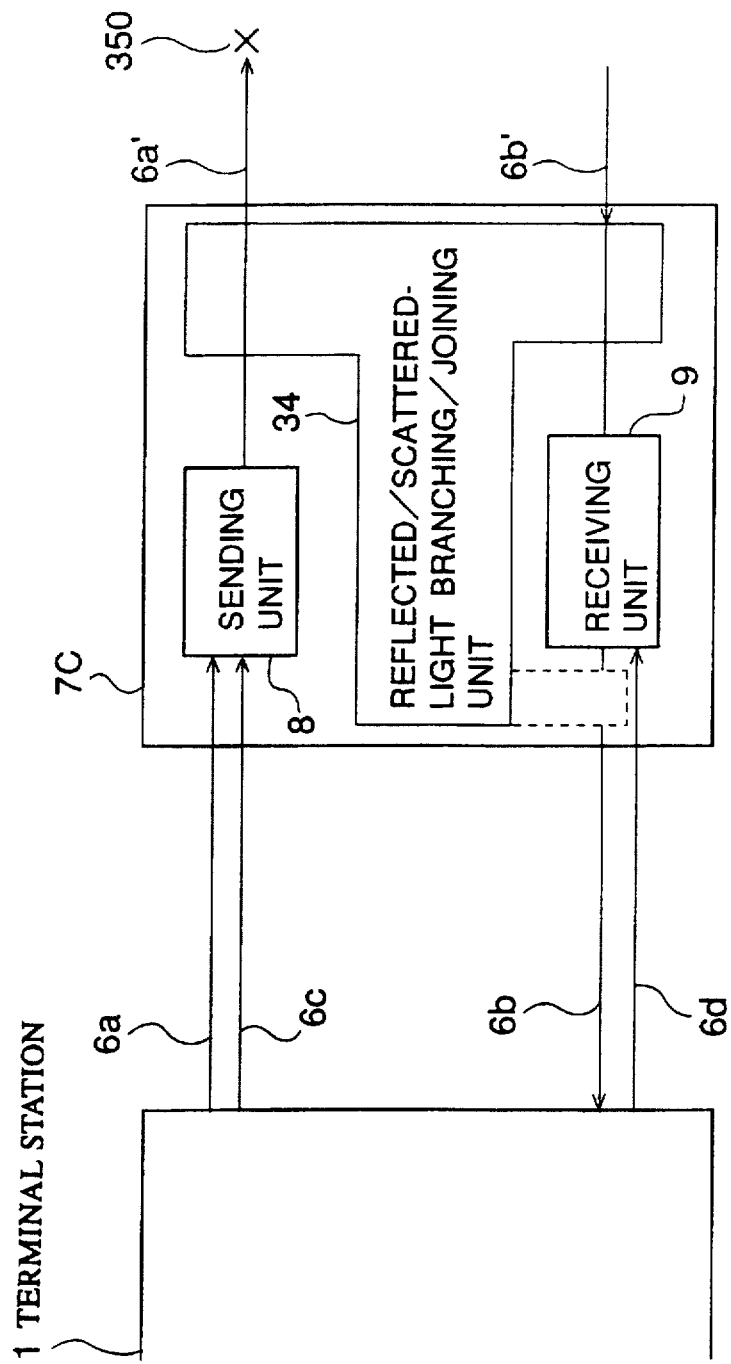

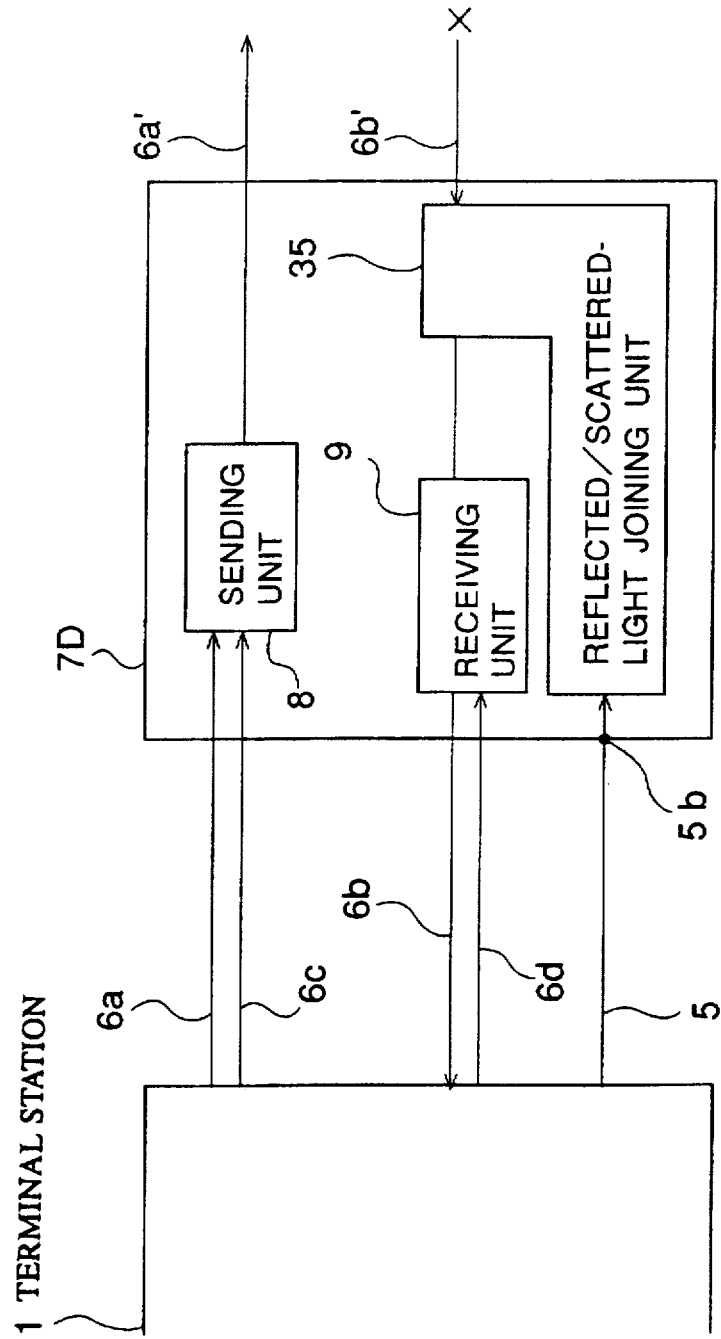

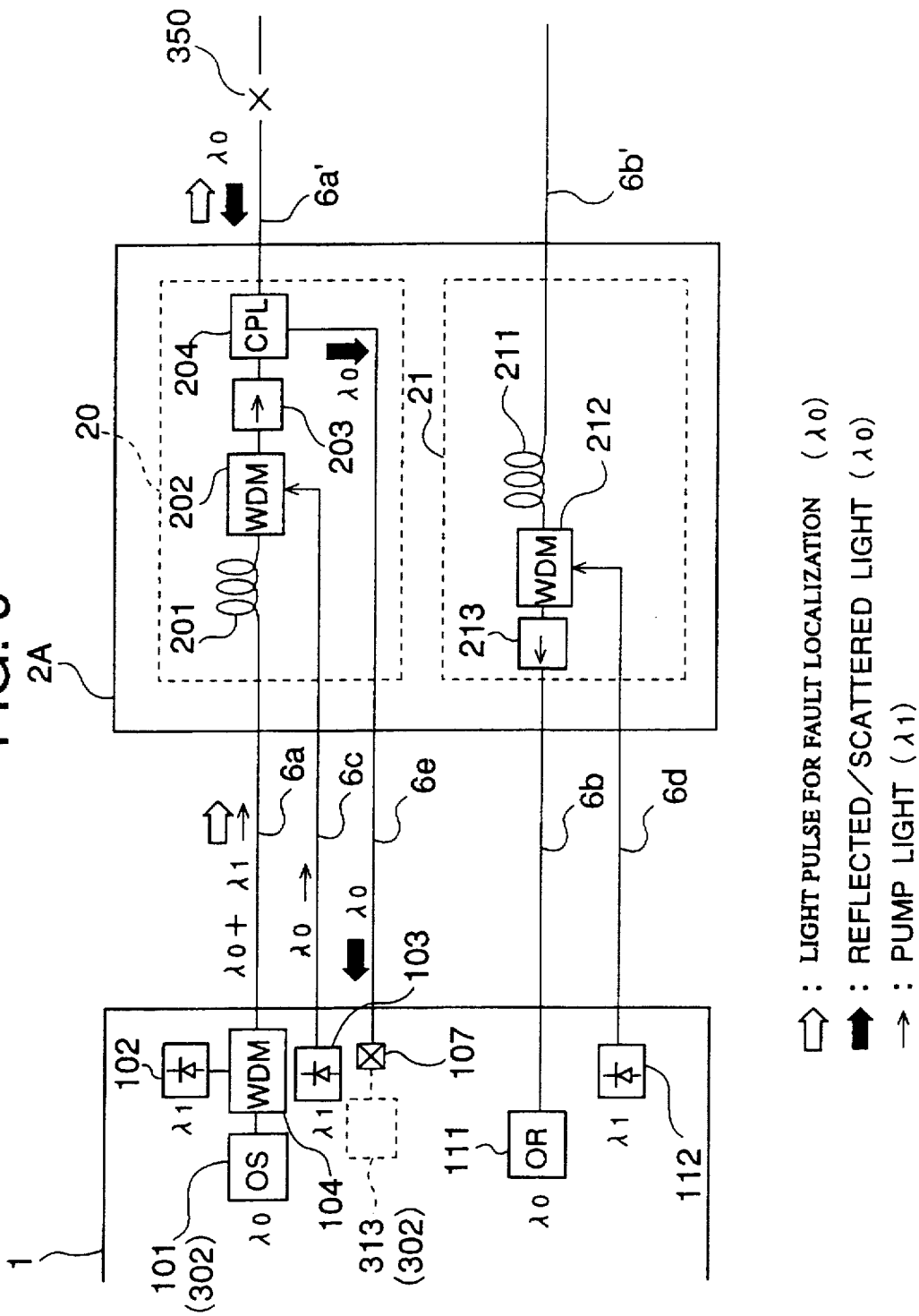

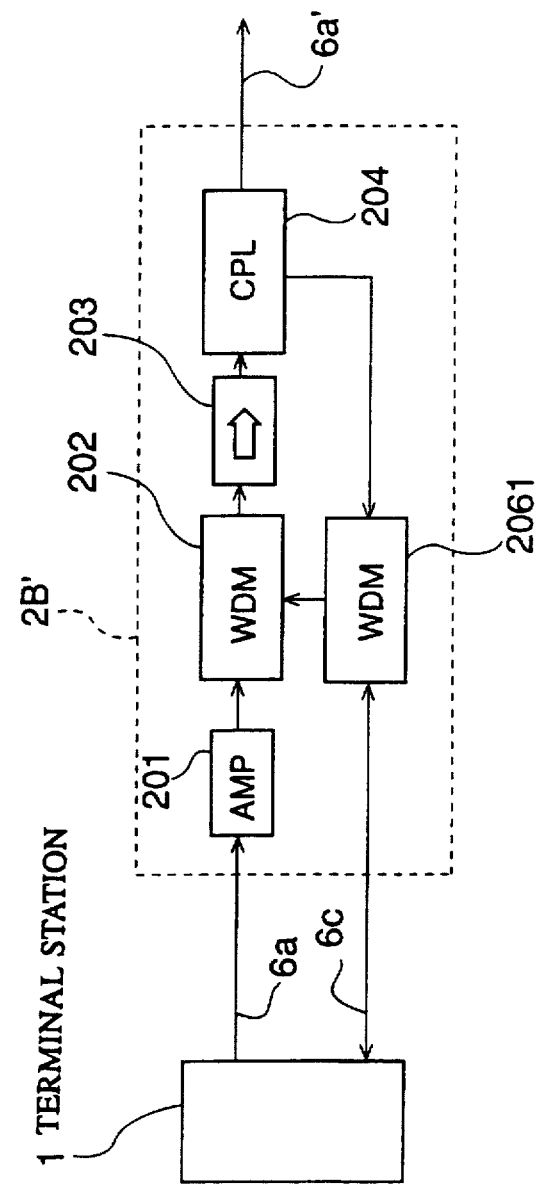

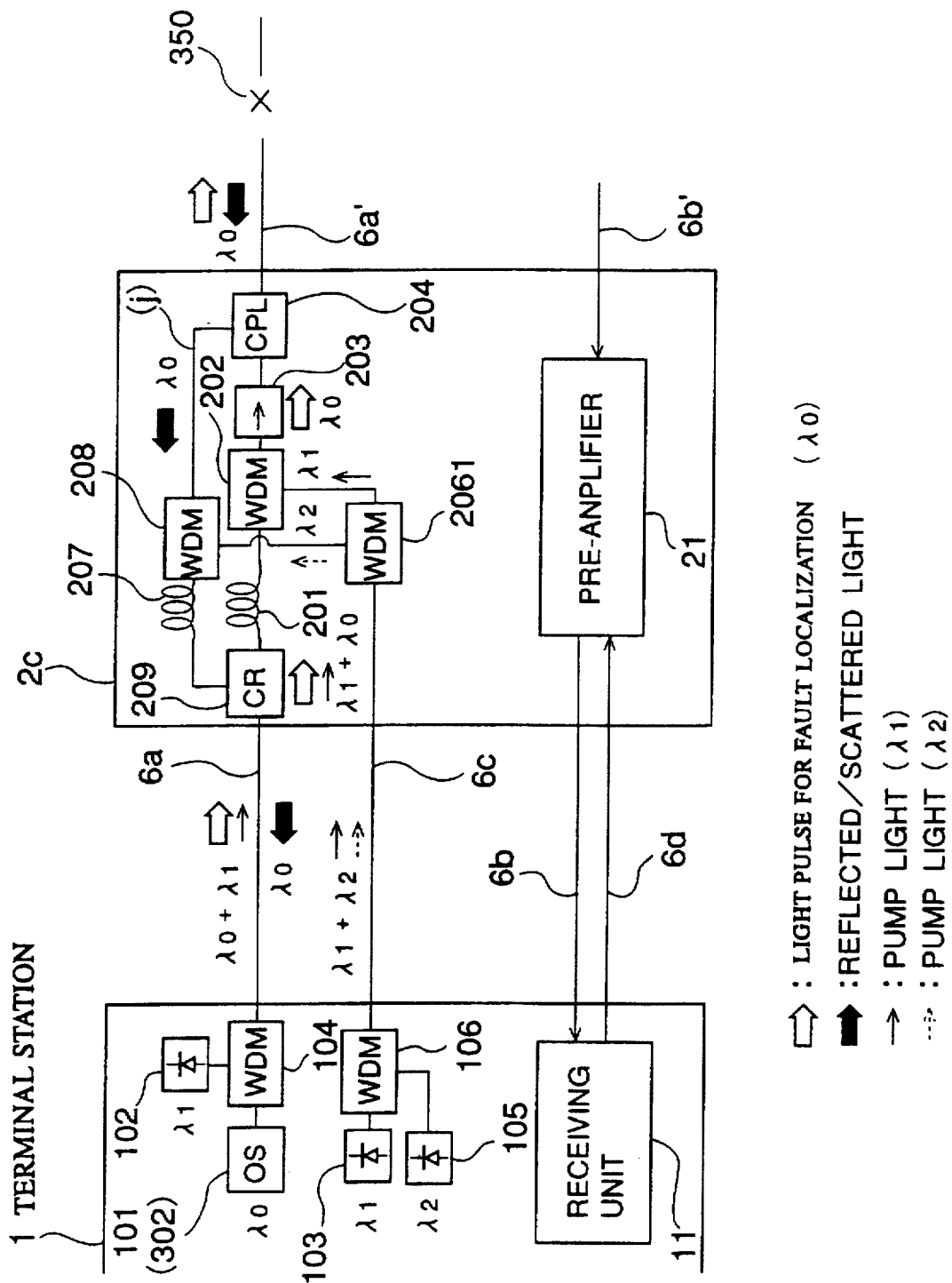

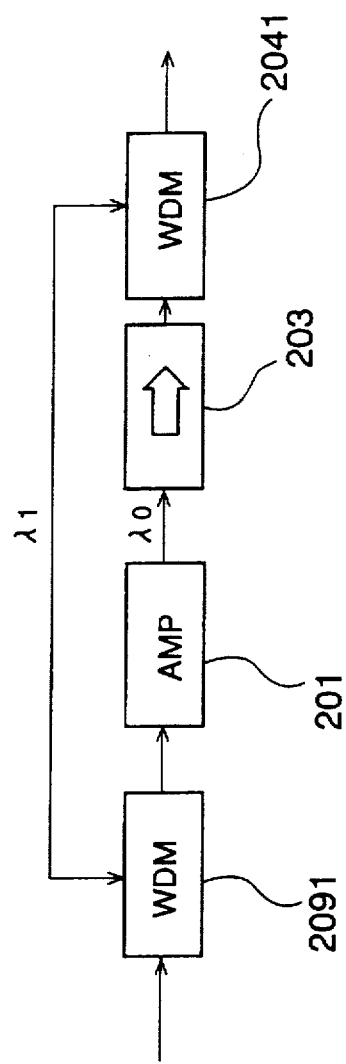
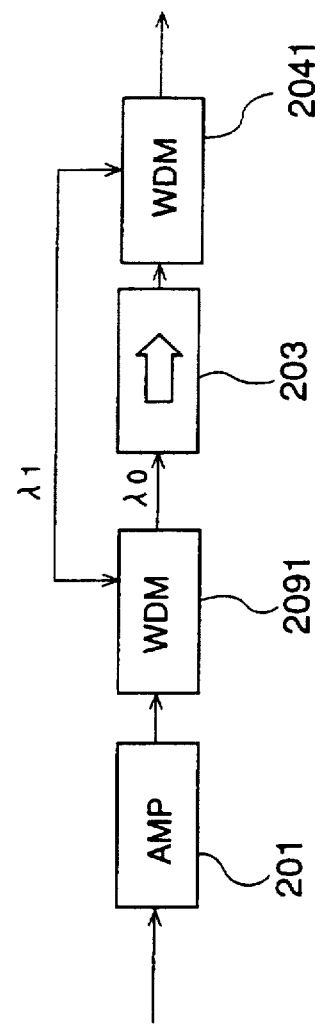
λ0 : WAVELENGTH OF SIGNAL LIGHT
λ1 : WAVELENGTH OF LIGHT PULSE FOR FAULT LOCALIZATION

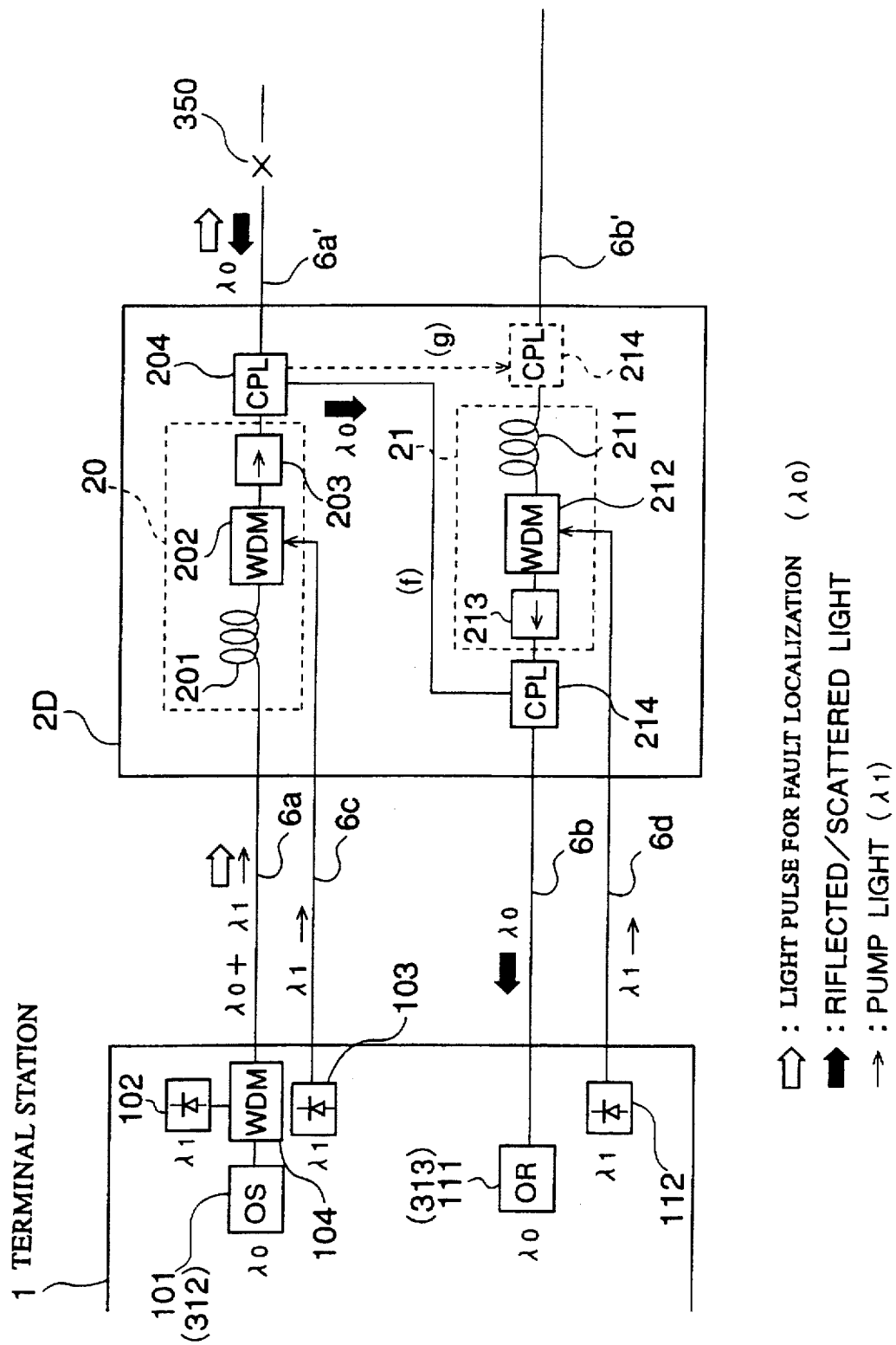

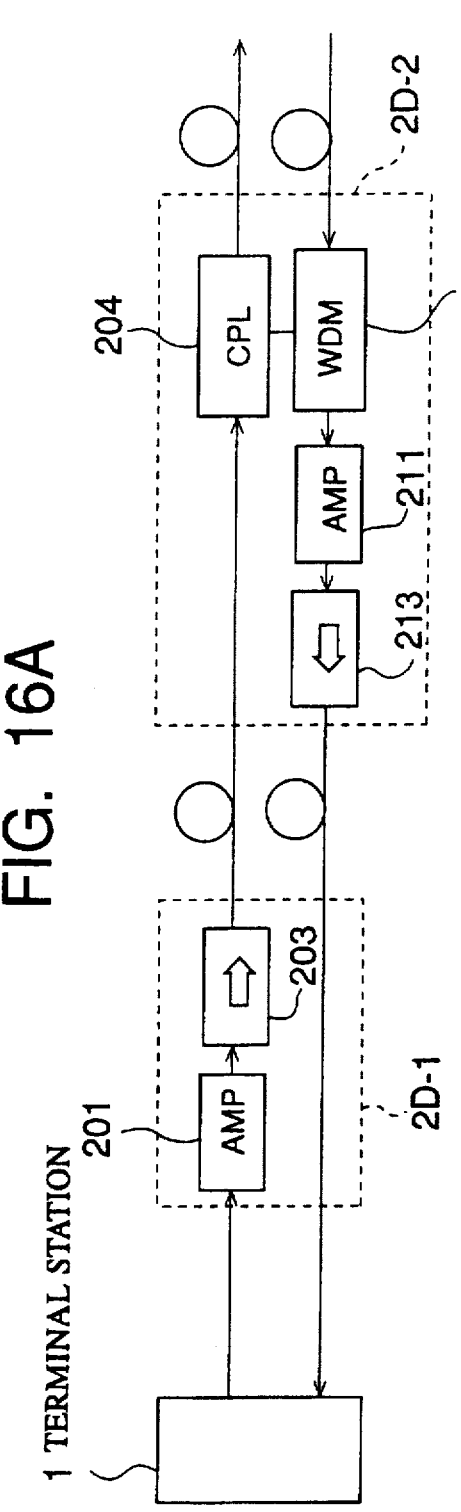
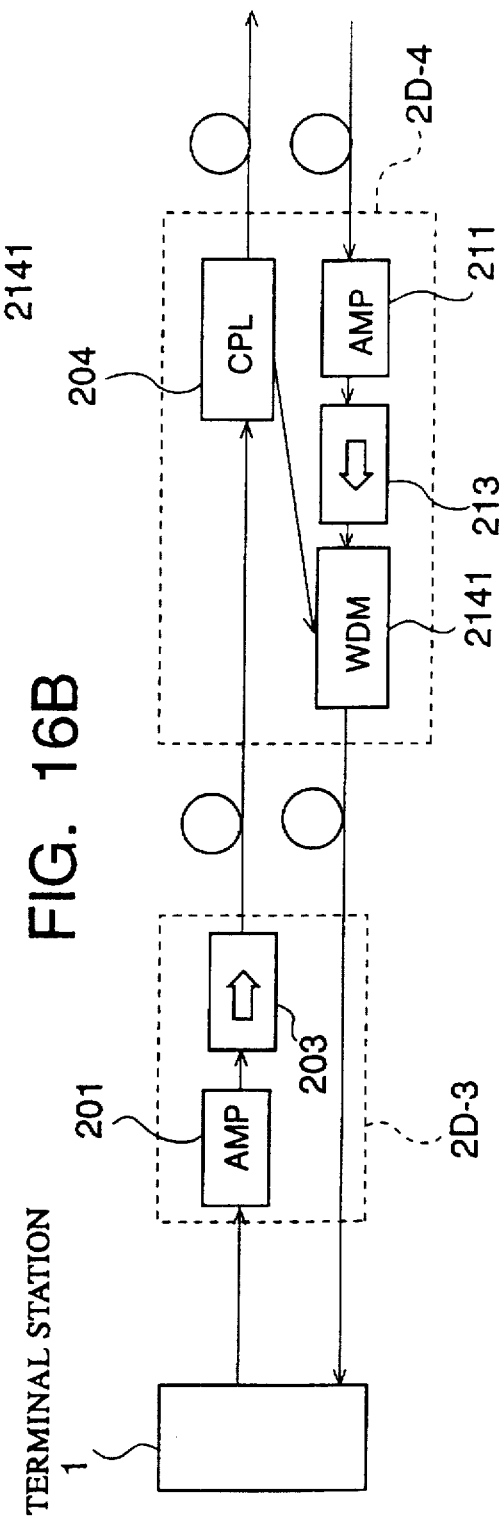
FIG. 16A
FIG. 16B

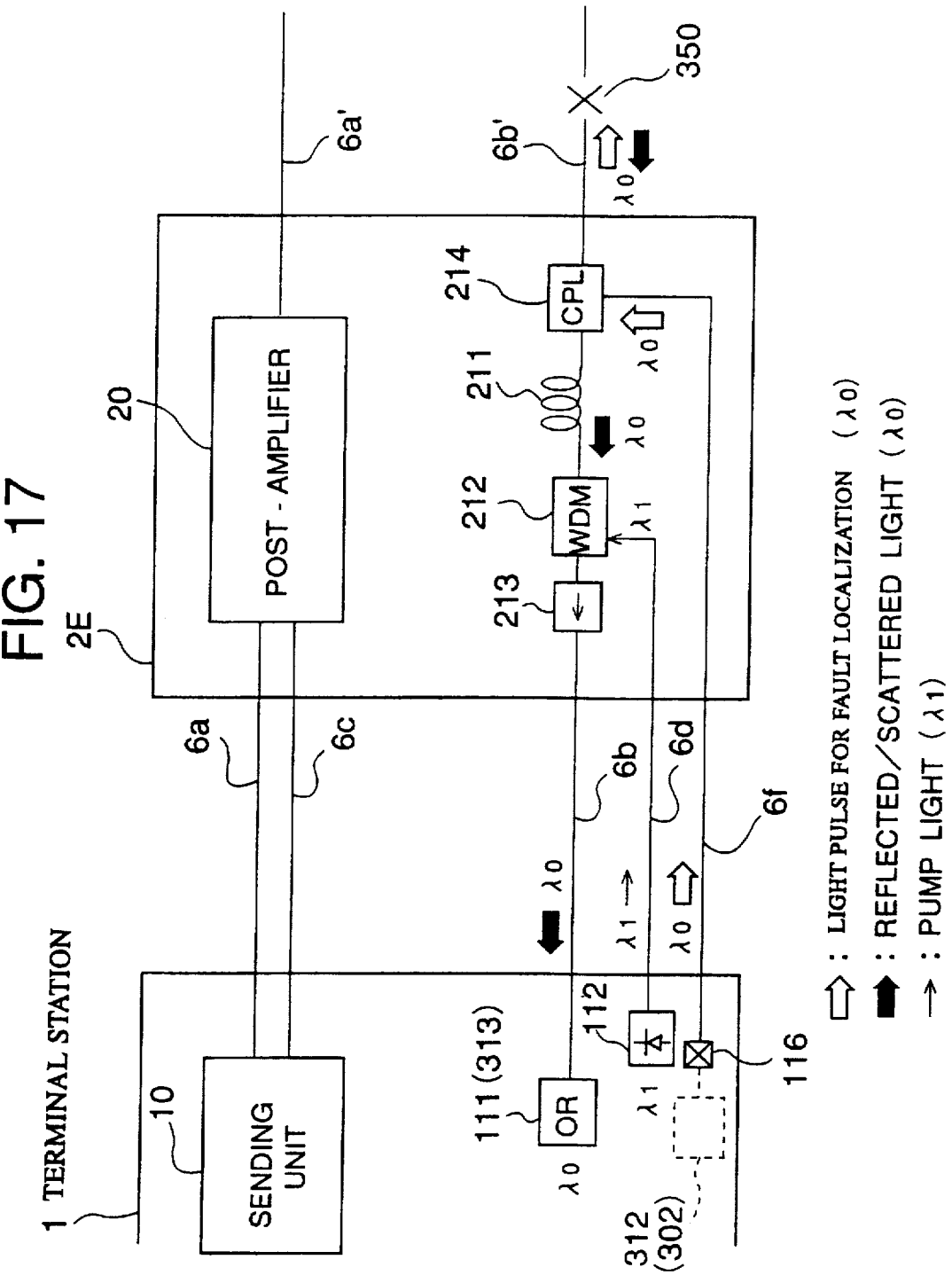

DEVICE FOR FAULT LOCALIZATION IN REPEATERLESS TRANSMISSION SYSTEM

BACKGROUND OF THE INVENTION

1. Field of the Invention

The present invention generally relates to optical-fiber communication, and particularly relates to remote amplifiers used in a repeaterless transmission system based on optical fibers and to a method of localizing fault points on optical fibers.

2. Description of the Related Art

A transmission system using optical fibers is classified into a transit transmission system and a repeaterless transmission system. The transit transmission system uses transit trunks provided at equal intervals on a transmission line which connect between two terminal stations, and the repeaterless transmission system does not use any transit trunk on the transmission line. Taking an example of ocean-bottom optical-fiber transmission, the transit transmission system is used for long-distance and deep-sea transmission, and the repeaterless transmission system is used for short-distance and shallow-sea transmission.

FIG. 1 is an illustrative drawing showing a schematic configuration of the repeaterless transmission system. Two terminal stations 1 are connected with each other via an optical-fiber cable 3. Each of the terminal stations 1 includes an optical-signal sending unit 101 for sending an optical signal and an optical-signal receiving unit 111 for receiving an optical signal.

The repeaterless transmission system is relatively inexpensive because trunks and power supply for the trunks are not necessary, but has a limit on a transmission distance. In order to obviate this problem, one or more remote amplifiers are provided on the transmission line. A remote amplifier receives a pump light from a terminal station, and amplifies an optical signal to lengthen the transmission distance. This is called a remote pump method.

FIG. 2 is an illustrative drawing showing a detailed configuration of the repeaterless transmission system. Two remote amplifiers 2 are provided on an optical-fiber cable 6 between the terminal stations 1 at points where the pump lights from the terminal stations 1 can reach (the distance which the pump light can travel is about 100 km). In the configuration in which the remote amplifiers 2 are used one each for the two terminal stations 1, the distance between the terminal stations 1 can be as long as 400 km by setting the remote amplifiers 200 km from each other.

In FIG. 2, the terminal station 1 includes a sending unit 10 and a receiving unit 11, and the remote amplifier 2 includes a post amplifier 20 and a pre-amplifier 21. Viewed from the terminal station 1 on the left of the figure, the sending unit 10 and the post amplifier 20 constitutes a sending system, and the receiving unit 11 and the pre-amplifier 21 constitutes a receiving system. The post amplifier 20 amplifies and optical signal sent from the sending unit 10, and the pre-amplifier 21 enhances the reception sensitivity of the receiving unit 11.

The sending unit 10 includes an optical-signal sending unit 101, a laser diode 102, a laser diode 103, and a WDM (wavelength division multiplexing) coupler 104. The receiving unit 11 includes an optical-signal receiving unit 111 and a laser diode 112.

The post amplifier 20 includes a fiber amplifier 201, a WDM coupler 202, and an optical isolator 203. The pre-amplifier 21 includes a fiber amplifier 211, a WDM coupler 212, and an optical isolator 213.

The optical-signal sending unit 101 sends signal light having a wavelength of $\lambda_0$, and the optical-signal receiving unit 111 receives signal light having a wavelength of $\lambda_0$. The fiber amplifiers 201 and 211 are erbium-doped-optical-fiber amplifiers which are excited by pump light having a wavelength of $\lambda_1$. The laser diodes 102 and 103 are excitation-light sources for effecting front excitation and rear excitation, respectively, of the fiber amplifier 201. The WDM couplers 104, 202, and 212 are optical couplers for splitting or mixing the light of wavelength $\lambda_0$ and the light of wavelength $\lambda_1$. The optical isolators 203 and 213 are devices which allow a one-way passage of light as shown by an arrow in the figure.

In a normal operation, the sending system operates as follows.

The signal light (wavelength $\lambda_0$) from the optical-signal sending unit 101 and front-pump light (wavelength $\lambda_1$) from the laser diode 102 are mixed in a sending-purpose optical fiber 6a by the WDM coupler 104. The mixed light is transmitted via the sending-purpose optical fiber 6a to an input end of the fiber amplifier 201 of the post amplifier 20. Rear-pump light (wavelength $\lambda_1$) from the laser diode 103 is transmitted via an excitation-purpose optical fiber 6c to the post amplifier 20, and, then, is joined with an output end of the fiber amplifier 201 by the WDM coupler 202. The signal light amplified by the fiber amplifier 201 passes through the WDM coupler 202 and the optical isolator 203, and, then, is transmitted to a sending-purpose optical fiber 6a' toward the terminal station 1 on the right of the figure.

The receiving system operates as follows.

Rear-pump light (wavelength $\lambda_1$) from the laser diode 112 is transmitted via an excitation-purpose optical fiber 6d to the pre-amplifier 21, and is joined with an output end of the fiber amplifier 211 by the WDM coupler 212. The signal light supplied to the fiber amplifier 211 from a receiving-purpose optical fiber 6b' is amplified by the fiber amplifier 211, and passes through the WDM coupler 212 and the optical isolator 213. Then, the signal light is transmitted via a receiving-purpose optical fiber 6b to the optical-signal receiving unit 111.

When the signal light coming out of the fiber amplifier 201 or the fiber amplifier 211 enters an optical fiber for transmission, Rayleigh scattering causes backward scattering of the signal light. If this backwardly scattered light comes back to enter the fiber amplifier, the scattered light is amplified and transmitted to the optical fiber again, thereby causing a deterioration of the signal-to-noise ratio of the signal light. The optical isolators 203 and 213 are provided at the output end of the fiber amplifiers 201 and 211, respectively, to prevent the entering of the backwardly scattered light.

When a fault of an optical-fiber cable such as a cut-off of the cable, an unexpected loss of the optical signal on the cable, or the like happens in the optical-fiber transmission system, a fault point on the cable needs to be identified by the terminal stations. In the repeaterless transmission system, since no power supply line is provided to remote amplifiers, the localization of the fault point needs to be done by using the optical fibers. A fault of an optical-fiber cable can be caused by a cut-off of the entire cable or a cut-off of some of the optical fibers inside the cable. Therefore, all the optical fibers in the cable must be individually checked for localizing the fault point.

The localization of the fault point for each optical fiber can be done by using an OTDR (optical time domain reflectometer). In the localization of the fault point based on the OTDR, a light pulse for fault localization is input from a terminal station into an optical fiber to be tested. The optical pulse reaching the fault point is reflected and scattered by the fault point to come back to the terminal station. At the terminal station, the reflected and scattered light is detected. An analysis of the detected light gives an evaluation to decide the position of the fault.

FIGS. 3A and 3B are illustrative drawings showing schematic configurations of two different types of the OTDR. An OTDR 300 of FIG. 3A includes an analysis/display unit 301 for analyzing a returned signal and displaying the result and a sending/receiving unit 302. The OTDR 300 is of a type having an optical-pulse sending unit and a receiving unit which are integrated as one unit. The sending/receiving unit 302 sends a light pulse for fault localization to an optical fiber 303, and receives reflected and scattered light from a fault point 350. The OTDR 300 as shown in FIG. 3A has a dynamic range of about 40 dB, and is capable of localizing a fault point as far as 200 km from the terminal station.

An OTDR 310 of FIG. 3B includes an analysis/display unit 311, a sending unit 312, and a receiving unit 313. The OTDR 310 is of a type which has an optical-pulse sending unit and a receiving unit as separate units. The sending unit 312 sends a light pulse for fault localization to an optical fiber 314, and the receiving unit 313 receives reflected and scattered light from a fault point 350 via another optical fiber 315. Here, a transit trunk 320 having photocouplers CPL is provided. The OTDR 310 can be used in the transit transmission system, and is capable of detecting a fault point between transit trunks. The OTDR 310 as shown in FIG. 3B has a dynamic range of about 20 dB, and is capable of localizing a fault point as far as 100 km from the nearest transit trunk.

In the repeaterless transmission system of the related art as shown in FIG. 2, fault localization for the optical-fiber cable is easily carried out by using the OTDR, as long as the fault point is located between a terminal station and a remote amplifier. When the fault point is present between remote amplifiers, however, a terminal station should detect the fault point via a remote amplifier. In this case, the optical pulse from the OTDR of the terminal station can reach the fault point via an optical isolator of the remote amplifier because the direction of the optical-pulse transmission corresponds to the direction of signal transmission. However, reflected and scattered light coming back from the fault point is prevented from passing through the optical isolator because the direction of the returning light is opposite of the direction of signal transmission. Thus, an OTDR cannot be used for fault localization for optical fibers in the prior art system.

Accordingly, there is a need in the repeaterless transmission system for a remote amplifier and a method of fault localization which allows fault localization using an OTDR at a terminal station to detect a fault point even when the fault point is located beyond the remote amplifier.

SUMMARY OF THE INVENTION

Accordingly, it is a general object of the present invention to provide a remote amplifier and a method of fault localization which satisfy the need described above.

It is another and more specific object of the present invention to provide a remote amplifier and a method of fault localization which allows fault localization using an OTDR at a terminal station to detect a fault point even when the fault point is located beyond the remote amplifier.

In order to achieve the above objects, a device according to the present invention is used for receiving input signal light and pump light from a first remote site through a first optical fiber and a second optical fiber, respectively, and for sending amplified signal light through a third optical fiber to a second remote site. The device includes an amplifier unit for amplifying the input signal light by using the pump light to transmit the amplified signal light to the third optical fiber, the amplifier unit having prevention unit for preventing light coming back through the third optical fiber from entering the amplifier unit, and a path providing unit for providing a path inside the device, the path leading reflection light coming through the third optical fiber to a connection point of the device, the connection point having optical connection with the first remote site, wherein the reflection light is a light pulse for fault localization reflected at a fault point on the third optical fiber, the light pulse for fault localization sent to the third optical fiber from the first remote site via the device.

According to the device described above, the path is provided inside the remote amplifier to lead the reflection light from the third optical fiber to the connection point which has an optical connection with the first remote site. Therefore, upon transmission of the light pulse for fault localization from the first remote site, the light pulse for fault localization is reflected at the fault point on the third optical fiber, and can take the path to come back to the first remote site. This achieves the localization of the fault point at the terminal station by using the OTDR even when the fault point is located beyond the remote amplifier.

Other objects and further features of the present invention will be apparent from the following detailed description when read in conjunction with the accompanying drawings.

BRIEF DESCRIPTION OF THE DRAWINGS

FIG. 2 is an illustrative drawing showing a detailed configuration of the repeaterless transmission system;

FIG. 4 is a block diagram of a remote amplifier according to a first principle of the present invention;

FIG. 5 is a block diagram of a remote amplifier according to a second principle of the present invention;

FIG. 6 is a block diagram of a remote amplifier according to a third principle of the present invention;

FIG. 7 is a block diagram of a remote amplifier according to a fourth principle of the present invention;

FIG. 8 is a block diagram of a remote amplifier according to a fifth principle of the present invention;

FIG. 9 is an illustrative drawing showing a first embodiment of a repeaterless transmission system according to the present invention;

FIG. 11 is a variation of the second embodiment shown in FIG. 10;

FIG. 12 is an illustrative drawing showing a third embodiment of a repeaterless transmission system according to the present invention;

FIGS. 13A and 13B are illustrative drawings showing configurations in which a detour route without amplification is provided;

FIG. 14 is an illustrative drawing showing a fourth embodiment of a repeaterless transmission system according to the present invention;

FIGS. 16A and 16B are illustrative drawings showing variations of the fourth embodiment of the present invention;

FIG. 17 is an illustrative drawing showing a fifth embodiment of a repeaterless transmission system according to the present invention;

DESCRIPTION OF THE PREFERRED EMBODIMENTS

Figure 1:
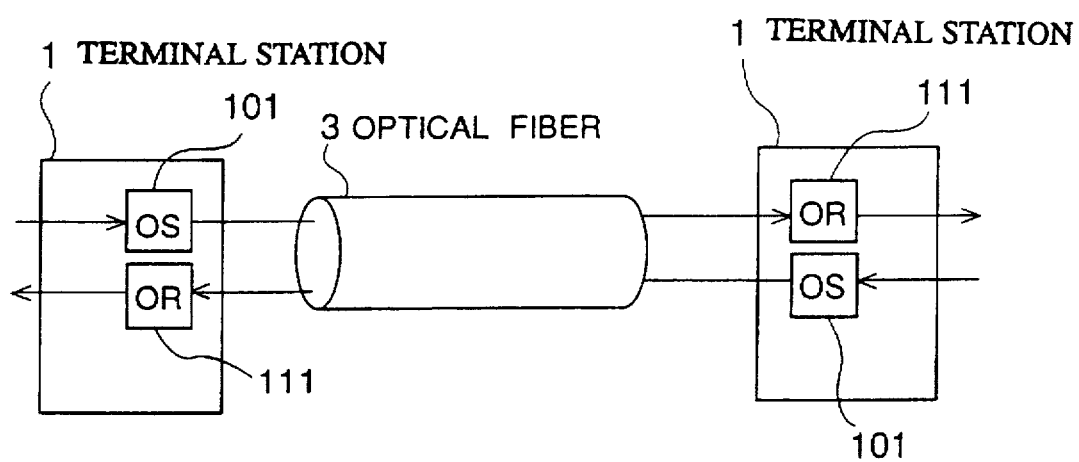
FIG. 1 is an illustrative drawing showing a schematic configuration of a repeaterless transmission system.

In the following, principles and embodiments of the present invention will be described with reference to the accompanying drawings.

FIG. 4 is a block diagram of a remote amplifier according to a first principle of the present invention. In FIG. 4, the same elements as those of FIG. 2 are referred to by the same numerals, and a description thereof will be omitted.

A remote amplifier 7 of FIG. 4 includes a fault-point-localization node 5a, a sending unit 8, a receiving unit 9, and a reflected/scattered-light branching unit 31. The fault-point-localization node 5a is connected to a localization-purpose transmission line 5 extending from the terminal station 1. The reflected/scattered-light branching unit 31 receives reflected and scattered light coming back to the remote amplifier 7 when a fault-point-localization signal is reflected and scattered by a fault point 350. The reflected/scattered-light branching unit 31 then leads the reflected and scattered light to the fault-point-localization node 5a. Here, the sending unit 8 and the receiving unit 9 are equivalent to the post amplifier 20 and the pre-amplifier 21 of FIG. 2, respectively.

Operations are as follows. The terminal station 1 sends the fault-point-localization signal to the localization-purpose transmission line 5. The fault-point-localization signal is then led to the sending-purpose optical fiber 6a' provided on the output side of the sending unit 8 by the reflected/scattered-light branching unit 31. When reaching the fault point 350 on the sending-purpose optical fiber 6a', the fault-point-localization signal is reflected and scattered by the fault point 350 to come back to the remote amplifier 7. The reflected and scattered light is led to the fault-point-localization node 5a by the reflected/scattered-light branching unit 31. The terminal station 1 detects the reflected and scattered light traveling through the localization-purpose transmission line 5 to localize the fault point 350 on the sending-purpose optical fiber 6a'.

In this method of localizing the fault point, the terminal station 1 may send the fault-point-localization signal to the sending-purpose optical fiber 6a rather than to the localization-purpose transmission line 5. In this case, the fault-point-localization signal is amplified by the sending unit 8, so that the fault localization is effective for a longer distance. Return paths for the reflected and scattered light are the same as for the previous case.

FIG. 5 is a block diagram of a remote amplifier according to a second principle of the present invention. In FIG. 5, the same elements as those of FIG. 4 are referred to by the same numerals, and a description thereof will be omitted.

A remote amplifier 7A of FIG. 5 includes a sending unit 8A, the receiving unit 9, and a reflected/scattered-light branching/joining unit 32. In FIG. 5, the reflected/scattered-light branching/joining unit 32 receives reflected and scattered light coming back to the remote amplifier 7A when the fault-point-localization signal is reflected and scattered by the fault point 350. The reflected/scattered-light branching/joining unit 32 then leads the reflected and scattered light to the excitation-purpose optical fiber 6c.

Operations are as follows. The terminal station 1 sends the fault-point-localization signal to the excitation-purpose optical fiber 6c. Here, the fault-point-localization signal has a wavelength different from that of the pump light. The fault-point-localization signal is then led to the sending-purpose optical fiber 6a' provided on the output side of the sending unit 8A by the reflected/scattered-light branching/joining unit 32. When reaching the fault point 350 on the sending-purpose optical fiber 6a', the fault-point-localization signal is reflected and scattered by the fault point 350 to come back to the remote amplifier 7A. The reflected and scattered light is led to the excitation-purpose optical fiber 6c by the reflected/scattered-light branching/joining unit 32. The terminal station 1 detects the reflected and scattered light traveling through the excitation-purpose optical fiber 6c to localize the fault point 350 on the sending-purpose optical fiber 6a'.

In this method of localizing the fault point, the terminal station 1 may send the fault-point-localization signal to the sending-purpose optical fiber 6a rather than to the excitation-purpose optical fiber 6c. In this case, the fault-point-localization signal is amplified by the sending unit 8A, so that the fault localization is effective for a longer distance. Return paths for the reflected and scattered light are the same as for the previous case.

FIG. 6 is a block diagram of a remote amplifier according to a third principle of the present invention. In FIG. 6, the same elements as those of FIG. 4 are referred to by the same numerals, and a description thereof will be omitted.

A remote amplifier 7B of FIG. 6 includes the sending unit 8, the receiving unit 9, and a reflected/scattered-light detouring unit 33. In FIG. 6, the reflected/scattered-light detouring unit 33 receives reflected and scattered light coming back to the remote amplifier 7B when the fault-point-localization signal is reflected and scattered by the fault point 350. The reflected/scattered-light detouring unit 33 then leads the reflected and scattered light to the sending-purpose optical fiber 6a by getting around the sending unit 8.

Operations are as follows. The terminal station 1 sends the fault-point-localization signal to the sending-purpose optical fiber 6a. The fault-point-localization signal is then amplified by the sending unit 8 and transmitted to the sending-purpose optical fiber 6a'. When reaching the fault point 350 on the sending-purpose optical fiber 6a', the fault-point-localization signal is reflected and scattered by the fault point 350 to come back to the remote amplifier 7B. The reflected and scattered light is led to the sending-purpose optical fiber 6a by the reflected/scattered-light detouring unit 33 getting around (bypassing) the optical isolator of the sending unit 8. The terminal station 1 detects the reflected and scattered light traveling through the sending-purpose optical fiber 6a to localize the fault point 350 on the sending-purpose optical fiber 6a'.

In this configuration, the reflected/scattered-light detouring unit 33 may include an optical amplifier to amplify the reflected and scattered light. In this case, the fault localization is effective for a longer distance.

FIG. 7 is a block diagram of a remote amplifier according to a fourth principle of the present invention. In FIG. 7, the same elements as those of FIG. 4 are referred to by the same numerals, and a description thereof will be omitted.

A remote amplifier 7C of FIG. 7 includes the sending unit 8, the receiving unit 9, and a reflected/scattered-light branching/joining unit 34. In FIG. 7, the reflected/scattered-light branching/joining unit 34 receives reflected and scattered light coming back to the remote amplifier 7C when the fault-point-localization signal is reflected and scattered by the fault point 350. The reflected/scattered-light branching/joining unit 34 then leads the reflected and scattered light to an input node or an output node of the receiving unit 9, so that the reflected and scattered light can reach the terminal station 1.

Operations are as follows. The terminal station 1 sends the fault-point-localization signal to the sending-purpose optical fiber 6a. The fault-point-localization signal is then amplified by the sending unit 8 and transmitted to the sending-purpose optical fiber 6a'. When reaching the fault point 350 on the sending-purpose optical fiber 6a', the fault-point-localization signal is reflected and scattered by the fault point 350 to come back to the remote amplifier 7C. The reflected and scattered light is led to the input node or the output node of the receiving unit 9 by the reflected/scattered-light branching/joining unit 34. The terminal station 1 detects the reflected and scattered light traveling through the receiving-purpose optical fiber 6b to localize the fault point 350 on the sending-purpose optical fiber 6a'.

FIG. 8 is a block diagram of a remote amplifier according to a fifth principle of the present invention. In FIG. 8, the same elements as those of FIG. 4 are referred to by the same numerals, and a description thereof will be omitted.

A remote amplifier 7D of FIG. 8 includes a fault-point-localization node 5b, the sending unit 8, the receiving unit 9, and a reflected/scattered-light joining unit 35. The fault-point-localization node 5b is connected to the localization-purpose transmission line 5 extending from the terminal station 1. The fault-point-localization signal sent to the localization-purpose transmission line 5 from the terminal station 1 is input to the fault-point-localization node 5b, and, then, is led to the receiving-purpose optical fiber 6b' on the input side of the receiving unit 9 by the reflected/scattered-light joining unit 35. The reflected/scattered-light joining unit 35 receives reflected and scattered light coming back to the remote amplifier 7D when the fault-point-localization signal is reflected and scattered by the fault point 350. The reflected/scattered-light joining unit 35 then leads the reflected and scattered light to an input node of the receiving unit 9, so that the reflected and scattered light can reach the terminal station 1.

Operations are as follows. The terminal station 1 sends the fault-point-localization signal to the localization-purpose transmission line 5. The fault-point-localization signal is input to the reflected/scattered-light joining unit 35 at the fault-point-localization node 5b, whereupon the fault-point-localization signal is led to the receiving-purpose optical fiber 6b'. Upon reaching the fault point 350 on the receiving-purpose optical fiber 6b', the fault-point-localization signal is reflected and scattered by the fault point 350 to come back to the remote amplifier 7D. The reflected and scattered light is input to the receiving unit 9 via the reflected/scattered-light joining unit 35. The receiving unit 9 amplifies the reflected and scattered signal to send it to the receiving-purpose optical fiber 6b. The terminal station 1 detects the reflected and scattered light traveling through the receiving-purpose optical fiber 6b to localize the fault point 350 on the receiving-purpose optical fiber 6b'.

The remote amplifier 7 of the fifth principle shown in FIG. 8 may further include a fault-point-localization-signal amplifier which amplifies the fault-point-localization signal received at the fault-point-localization node 5b. This configuration extends an effective distance range of the fault localization.

In the following, embodiments of the present invention will be described with reference to the accompanying drawings. In these embodiments provided below, the present invention will be applied to the repeaterless communication system of the related art shown in FIG. 2. In these embodiments, operations under fault-free conditions are almost the same as those of the related art. In the following figures, the same elements as those of FIG. 2 are referred to by the same numerals, and a description thereof will be omitted.

FIG. 9 is an illustrative drawing showing a first embodiment of a repeaterless transmission system according to the present invention. In the first embodiment, a localization-purpose optical fiber 6e is provided between the terminal station 1 and a remote amplifier 2A, and an optical coupler 204 is used for joining the localization-purpose optical fiber 6e with the sending-purpose optical fiber 6a'.

In the normal operation mode, i.e., under fault-free conditions, the localization-purpose optical fiber 6e is not used. When a fault point needs to be identified, the OTDR 310 of FIG. 3B is used in localization operations as follows.

In the terminal station 1, the sending unit 312 of the OTDR 310 is installed in place of the optical-signal sending unit 101, and the receiving unit 313 of the OTDR 310 is connected to a node 107 of the localization-purpose optical fiber 6e. The sending unit 312 transmits a light pulse for fault localization having the same wavelength $\lambda_0$ as the optical signal. The fiber amplifier 201 is in an excited condition as in the normal operation mode, so that the light pulse for fault localization is amplified by the fiber amplifier 201 before being transmitted to the sending-purpose optical fiber 6a'. Reflected and scattered light coming back from the fault point 350 on the sending-purpose optical fiber 6a' is input to the optical coupler 204 of the remote amplifier 2A. The optical coupler 204 leads the reflected and scattered light to the localization-purpose optical fiber 6e, so that the receiving unit 313 of the OTDR 310 can detect the reflected and scattered light.

Alternately, the OTDR 300 of FIG. 3A may be used in localization operations as follows.

In the terminal station 1, the sending/receiving unit 302 of the OTDR 300 is connected to the node 107 of the localization-purpose optical fiber 6e. A light pulse for fault localization transmitted from the sending/receiving unit 302 reaches the fault point 350 via the localization-purpose optical fiber 6e, the optical coupler 204, and the sending-purpose optical fiber 6a'. The reflected and scattered light comes back to the sending/receiving unit 302 along the same route in a reverse direction.

Figure 10:
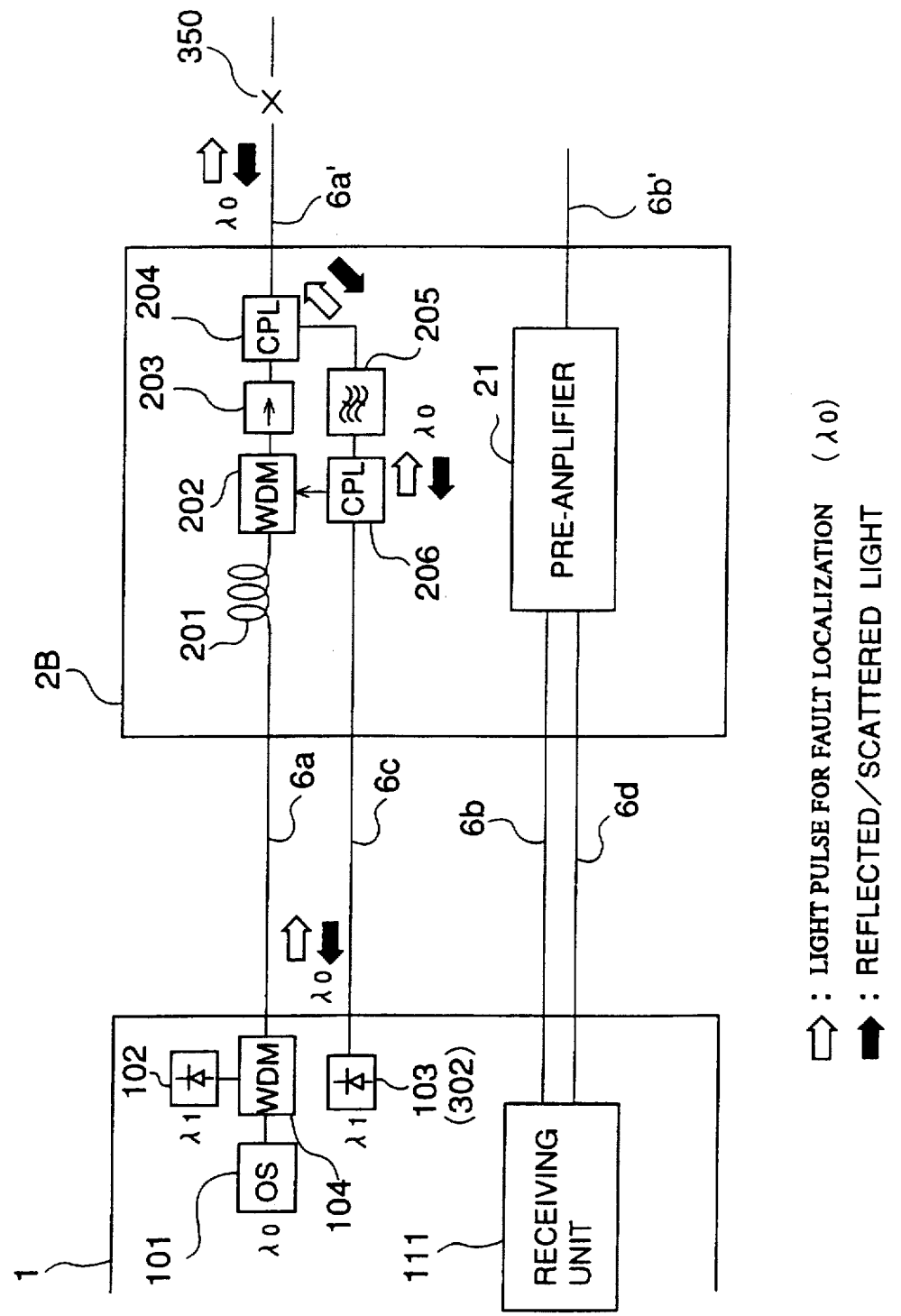
FIG. 10 is an illustrative drawing showing a second embodiment of a repeaterless transmission system according to the present invention.

FIG. 10 is an illustrative drawing showing a second embodiment of a repeaterless transmission system according to the present invention. In the second embodiment, an optical coupler 206 is provided at one end of the excitation-purpose optical fiber 6c in the remote amplifier 2B, and a band-pass filter 205 connects the optical coupler 206 with the optical coupler 204. The band-pass filter 205 has such frequency characteristics that it passes only a light pulse for fault localization having a different wavelength from that of the pump light. In this embodiment, the light pulse for fault localization has the same wavelength as that of the light signal.

In the normal operation mode, the pump light traveling through the excitation-purpose optical fiber 6c is blocked by the band-pass filter 205 so as not to reach the optical coupler 204. Thus, there is no adverse effect on the signal light passing through the optical coupler 204 toward the sending-purpose optical fiber 6a'. At the time of the fault localization, the OTDR 300 of FIG. 3A is used as follows.

In the terminal station 1, the sending/receiving unit 302 of the OTDR 300 is installed in place of the laser diode 103 for the excitation purpose. The optical-signal sending unit 101 and the laser diode 102 are inactive. The sending/receiving unit 302 transmits a light pulse for fault localization having the same wavelength $\lambda_0$ as the signal light. The light pulse for fault localization travels through the excitation-purpose optical fiber 6c to reach the remote amplifier 2B. Then, the light pulse for fault localization passes through the optical coupler 206 and the band-pass filter 205 to reach the optical coupler 204, where the light pulse for fault localization is joined to the sending-purpose optical fiber 6a'. The reflected and scattered light from the fault point 350 on the sending-purpose optical fiber 6a' comes back to the terminal station 1 along the same route as described above, and the sending/receiving unit 302 detects the reflected and scattered light.

FIG. 11 is a variation of the second embodiment shown in FIG. 10. In a remote amplifier 2B' of FIG. 11, a WDM coupler 2061 is used in place of the band-pass filter 205 and the optical coupler 206. The WDM coupler 2061 is capable of mixing and splitting light of the wavelength $\lambda_0$ and light of the wavelength $\lambda_1$.

In the normal operation mode, the pump light of the wavelength $\lambda_1$ supplied to the WDM coupler 2061 through the excitation-purpose optical fiber 6c is split by the WDM coupler 2061 to be entirely directed to the WDM coupler 202. Thus, this pump light has no adverse effect on the signal light passing through the optical coupler 204. At the time of the fault localization, the OTDR 310 of FIG. 3B is used as follows.

In the terminal station 1, the sending unit 312 of the OTDR 310 replaces the optical-signal sending unit 101, and the receiving unit 313 of the OTDR 310 replaces the laser diode 103 for the rear-excitation purpose. The sending unit 312 transmits a light pulse for fault localization having the same wavelength as the signal light to the sending-purpose optical fiber 6a. The fiber amplifier 201 is in an excited condition as in the normal operation mode, so that the light pulse for fault localization is amplified by the fiber amplifier 201 before being transmitted to the sending-purpose optical fiber 6a'. Reflected and scattered light coming back from a fault point on the sending-purpose optical fiber 6a' is input to the optical coupler 204 of the remote amplifier 2B'. The optical coupler 204 splits the reflected and scattered light to direct it to the excitation-purpose optical fiber 6c via the WDM coupler 2061. The receiving unit 313 of the OTDR 310 can detect the reflected and scattered light at the terminal station 1.

FIG. 12 is an illustrative drawing showing a third embodiment of a repeaterless transmission system according to the present invention. In this embodiment, a detour route (j) is provided in parallel to the route along which the signal light passes, so that a light pulse for fault localization can get around the optical isolator 203 by taking this detour route.

A remote amplifier 2C of FIG. 12 includes the pre-amplifier 21, the fiber amplifier 201, the WDM coupler 202, the optical isolator 203, the optical coupler 204, the WDM coupler 2061, a fiber amplifier 207, a WDM coupler 208, and a circulator 209. The detour route is comprised of the fiber amplifier 207 and the WDM coupler 208, and is connected in parallel to the route for the signal light by the circulator 209 and the optical coupler 204. The fiber amplifier 207 is used for amplifying the reflected and scattered light along the detour route. In order to supply a pump light to the fiber amplifier 207, a laser diode 105 is provided in the terminal station 1, and a WDM coupler 106 is also provided to couple the light from the laser diode 103 and the light from the laser diode 105.

The laser diode 105 transmits a pump light having a wavelength $\lambda_2$ used for the excitation of the fiber amplifier 207. The WDM coupler 106 mixes the pump light (wavelength $\lambda_1$) from the laser diode 103 with the pump light (wavelength $\lambda_2$) from the laser diode 105, and transmits the mixed light on the excitation-purpose optical fiber 6c. The WDM coupler 2061 splits the two pump lights sent through the excitation-purpose optical fiber 6c. The WDM coupler 2061 feeds the pump light of the wavelength $\lambda_1$ to the WDM coupler 202, and feeds the pump light of the wavelength $\lambda_2$ to the WDM coupler 208. The WDM coupler 208 provides the pump light of the wavelength $\lambda_2$ for the detour route (j). The circulator 209 directs the reflected and scattered light, which has traveled along the detour route, into the sending-purpose optical fiber 6a. Also, the circulator 209 directs the signal light, which is sent from the terminal station 1 through the sending-purpose optical fiber 6a, to the signal-light path (i.e., to the fiber amplifier 201).

In the normal operation mode, the laser diode 105 of the terminal station 1 sends no pump light to excite the WDM coupler 208. In this case, the detour route is provided with attenuation larger than almost 20 dB. During the time of fault localization, the OTDR 300 of FIG. 3A is used as follows.

In the terminal station 1, the optical-signal sending unit 101 is replaced by the sending/receiving unit 302 of the OTDR 300. The laser diode 105 sends the pump light to put the fiber amplifier 207 in an excitation state. The sending/receiving unit 302 of the OTDR 300 transmits a light pulse for fault localization having the same wavelength $\lambda_0$ as the signal light. The light pulse for fault localization is amplified by the fiber amplifier 201, and transmitted to the sending-purpose optical fiber 6a'. The reflected and scattered light coming back from the fault point 350 of the sending-purpose optical fiber 6a' is branched by the optical coupler 204 to travel along the detour route. The reflected and scattered light is amplified by the fiber amplifier 207, and is directed to the sending-purpose optical fiber 6a by the circulator 209. Finally, the sending/receiving unit 302 of the OTDR 300 in the terminal station 1 receives the reflected and scattered light.

In the third embodiment of FIG. 12, the reflected and scattered light is amplified along the detour route. However, the reflected and scattered light may be merely detoured along the detour route to get around the optical isolator 203 without any amplification.

FIGS. 13A and 13B are illustrative drawings showing configurations in which a detour route without amplification is provided. In the configurations of FIG. 13A and FIG. 13B, the signal light and the light pulse for fault localization have different wavelengths.

In FIG. 13A, a signal light (wavelength $\lambda_0$) passes through the fiber amplifier 201 and the optical isolator 203, whereas a light pulse for fault localization is led to the detour route because it has a wavelength $\lambda_1$. Also, reflected and scattered light (wavelength $\lambda_1$) is led to the detour route on its return. These selections of routes based on the wavelengths are achieved by a WDM coupler 2091 and a WDM coupler 2041. In this configuration, the detour route has no effect on the signal light because of the wavelength-dependent route selection.

In FIG. 13B, a detour route is provided to get around only the optical isolator 203, so that the fiber amplifier 201 is effective for both the signal light and the light pulse for fault localization. In this configuration, an effective range of the fault localization is extended compared to the configuration of FIG. 13A.

FIG. 14 is an illustrative drawing showing a fourth embodiment of a repeaterless transmission system according to the present invention. In this embodiment, reflected and scattered light is branched off from a signal-light sending path, and is led to a signal-light receiving path. A remote amplifier 2D of FIG. 14 includes the fiber amplifier 201, the WDM coupler 202, the optical isolator 203, the optical coupler 204, the fiber amplifier 211, the WDM coupler 212, the optical isolator 213, and an optical coupler 214. The optical coupler 204 provides a branch diverging from the signal-light sending path, and the optical coupler 214 connects the branch to the signal-light receiving path. As shown in FIG. 14, a position of the optical coupler 214 can be on an output side of the pre-amplifier 21 or on an input side of the pre-amplifier 21. In FIG. 14, a first branch connected to the output side of the pre-amplifier 21 is denoted as (f), and a second branch connected to the input side of pre-amplifier 21 is denoted as (g).

During the time of the fault localization, the OTDR 310 of FIG. 3B is used as follows.

In the terminal station 1, the sending unit 312 of the OTDR 310 is installed in place of the optical-signal sending unit 101, and the receiving unit 313 of the OTDR 310 replaces the optical-signal receiving unit 111. The sending unit 312 of the OTDR 310 transmits a light pulse for fault localization having the same wavelength $\lambda_o$ as the signal light. The light pulse for fault localization is amplified by the fiber amplifier 201 before being transmitted to the sending-purpose optical fiber 6a'. The reflected and scattered light coming back from the fault point 350 of the sending-purpose optical fiber 6a' is received by the optical coupler 204. The optical coupler 204 directs the reflected and scattered light to the first branch (f) or the second branch (g), so that the reflected and scattered light can reach the terminal station 1. The receiving unit 313 of the OTDR 300 in the terminal station 1 detects the reflected and scattered light.

When the second branch (g) is used, the reflected and scattered light is amplified by the fiber amplifier 211. Thus, the use of the second branch (g) provides a longer range for the fault localization.

When optical couplers are used for establishing the branch as in this embodiment, the receiving signal light can be affected by backwardly-scattered light of the sending signal light during the normal operation. This is because the backwardly-scattered light travels through the branch to enter the receiving-purpose optical fiber 6b. In order to avoid this, losses along the branch should be substantially larger than losses of the signal light traveling along the signal-light paths.

Figure 15A:
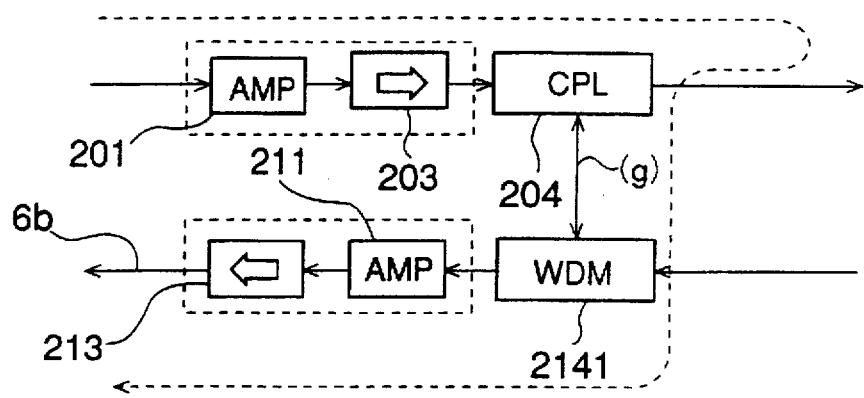
FIGS. 15A and 15B are illustrative drawings showing configurations in which a WDM coupler is used in place of an optical coupler of FIG. 14.
Figure 15B:
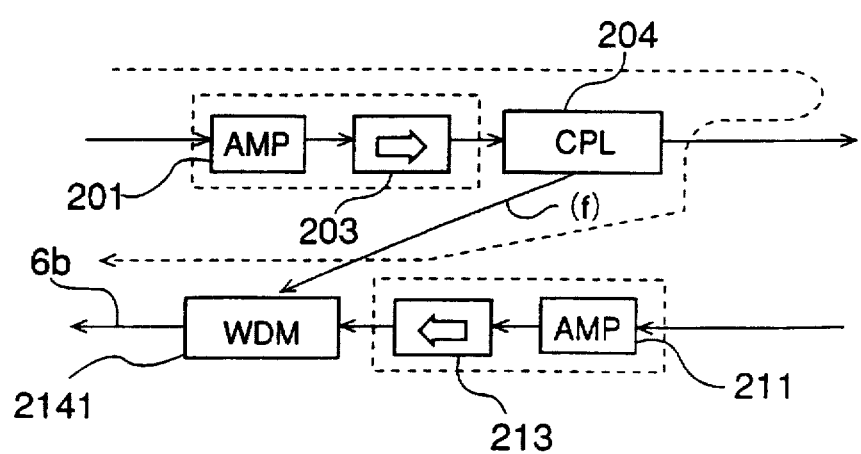

FIGS. 15A and 15B are illustrative drawings showing configurations in which a WDM coupler 2141 is used in place of the optical coupler 214 of FIG. 14. In these figures, the WDM coupler 2141 replacing the optical coupler 214 makes it possible to use a small-loss branch without having an adverse effect on the receiving signal light. In this case, the signal light and the light pulse for fault localization use different wavelengths, so that only the reflected and scattered light of the light pulse for fault localization can enter the receiving-purpose optical fiber 6b after traveling through the branch. The backwardly-scattered light of the signal light travels through the branch, but passes through the WDM coupler 2141 to come out from an unused node thereof. Such wavelength selectivity is provided by the WDM coupler 2141.

In the fourth embodiment of FIG. 14, the remote amplifier 2D has the post amplifier 20 and the pre-amplifier 21 which are integrated with each other. Because of this integration, the post amplifier 20 and the pre-amplifier 21 are installed on the same position on the optical-fiber cable 6. Depending on the characteristics of the signal light, however, there is a case in which an optimal position of the post amplifier 20 and an optimal position of the pre-amplifier 21 are different. In general, the optimal position of the pre-amplifier 21 is more distant from the terminal station 1 than is the optimal position of the post amplifier 20.

FIGS. 16A and 16B are illustrative drawings showing variations of the fourth embodiment of the present invention. In these variations, the remote amplifier 2D is separated into two parts in order to place the post amplifier 20 and the pre-amplifier 21 at optimum positions.

FIG. 16A shows a case in which the WDM coupler 2141 is provided at the input of the fiber amplifier 211, and a branch is established between the optical coupler 204 and the WDM coupler 2141. The remote amplifier 2D is divided into a part 2D-1 and a part 2D-2 as shown in the figure. FIG. 16B shows a case in which the WDM coupler 2141 is provided at the output of the optical isolator 213, and a branch is established between the optical coupler 204 and the WDM coupler 2141. The remote amplifier 2D is divided into a part 2D-3 and a part 2D-4 as shown in the figure.

FIG. 17 is an illustrative drawing showing a fifth embodiment of a repeaterless transmission system according to the present invention. In the fifth embodiment, a localization-purpose transmission line 6f is provided between the terminal station 1 and a remote amplifier 2E. Also, in the remote amplifier 2E, the optical coupler 214 is used for connecting the localization-purpose transmission line 6f to the receiving-purpose optical fiber 6b'.

In the normal operation mode, the localization-purpose transmission line 6f is not used. During the time of fault localization, the OTDR 310 of FIG. 3B is used as follows.

In the terminal station 1, the receiving unit 313 of the OTDR 310 is installed in place of the optical-signal receiving unit 111, and the sending unit 312 of the OTDR 310 is connected to a node 116 of the localization-purpose transmission line 6f. The sending unit 312 transmits a light pulse for fault localization having the same wavelength $\lambda_o$ as the signal light. The light pulse for fault localization is sent to the remote amplifier 2E via the localization-purpose transmission line 6f, and is joined to the receiving-purpose optical fiber 6b' by the optical coupler 214. The fiber amplifier 211 is in an excitation state as in the normal operation mode, so that the reflected and scattered light coming back from the fault point 350 of the receiving-purpose optical fiber 6b' is amplified by the fiber amplifier 211. Then, the reflected and scattered light travels through the receiving-purpose optical fiber 6b to the terminal station 1. The receiving unit 313 of the OTDR 310 detects the reflected and scattered light.

Figure 3A:
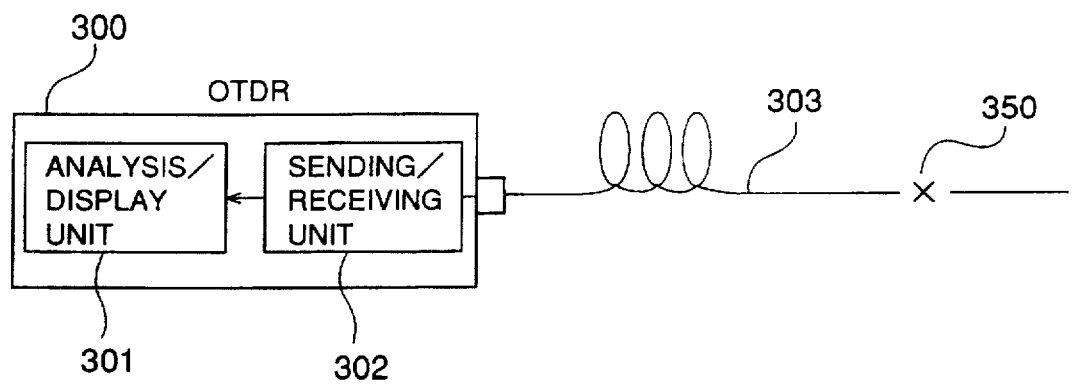
FIGS. 3A and 3B are illustrative drawings showing schematic configurations of two different types of OTDRs.
Figure 3B:
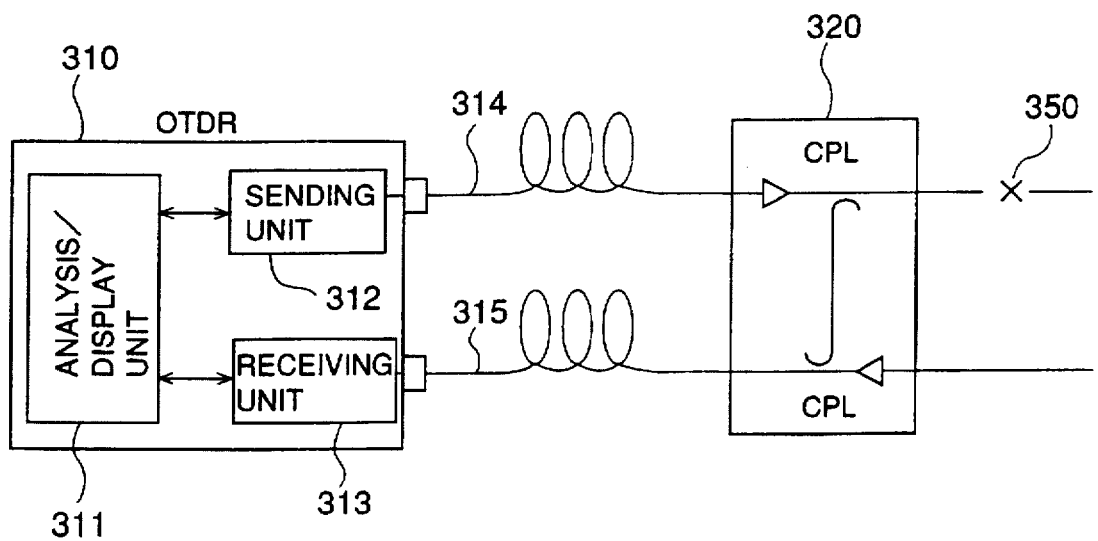

In addition, the OTDR 300 of FIG. 3A is used as follows.

In the terminal station 1, the sending/receiving unit 302 of the OTDR 300 is connected to the node 116 of the localization-purpose transmission line 6f. A light pulse for fault localization transmitted from the sending/receiving unit 302 reaches the fault point 350 via the localization-purpose optical fiber 6f, the optical coupler 214, and the receiving-purpose optical fiber 6b'. The reflected and scattered light comes back to the sending/receiving unit 302 along the same route in a reverse direction.

Figure 18:
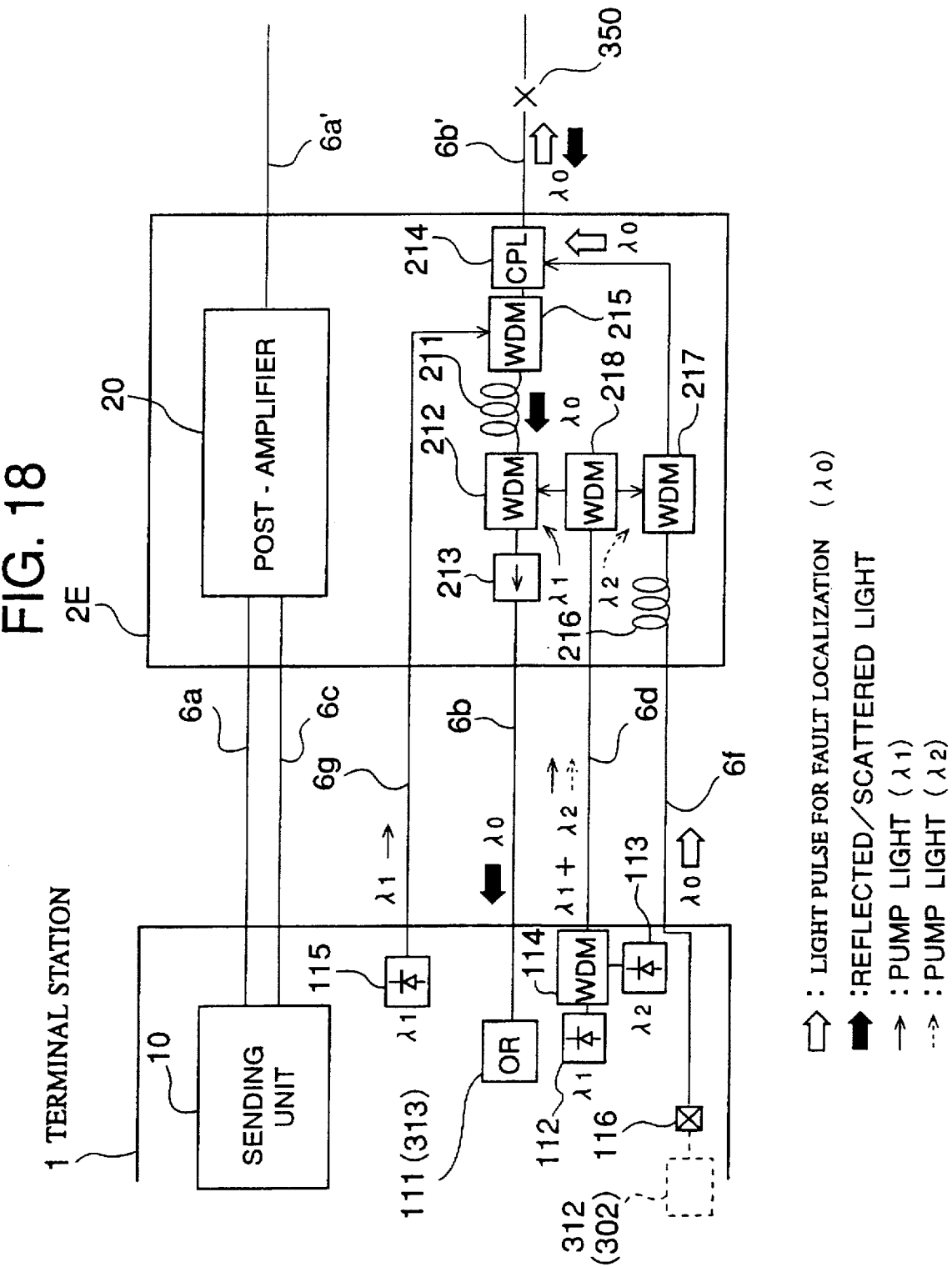
FIG. 18 is an illustrative drawing showing a sixth embodiment of a repeaterless transmission system according to the present invention.

FIG. 18 is an illustrative drawing showing a sixth embodiment of a repeaterless transmission system according to the present invention. The sixth embodiment is based on the configuration of the fifth embodiment of FIG. 17. In the sixth embodiment of FIG. 18, a remote amplifier 2F includes a WDM coupler 215, a fiber amplifier 216, a WDM coupler 217, and a WDM coupler 218 in addition to the elements provided in FIG. 17. The fiber amplifier 216 is placed between the localization-purpose transmission line 6f and the optical coupler 214 to amplify a light pulse for fault localization. Also, bilateral excitation is applied to the fiber amplifier 211 to enhance reception sensitivity for the receiving signal light and the reflected and scattered light.

In the terminal station 1, a laser diode 113, a WDM coupler 114, and a laser diode 115 are provided in addition to the previously disclosed elements. The laser diode 113 is used for the rear-excitation of the fiber amplifier 216, and the laser diode 115 is used for the front-excitation of the fiber amplifier 211. The WDM coupler 114 mixes the pump light (wavelength $\lambda_1$) of the laser diode 112 and the pump light (wavelength $\lambda_2$) of the laser diode 113, and provides the mixed light to the excitation-purpose optical fiber 6d.

In the remote amplifier 2F, the WDM coupler 218 splits the two pump lights sent through the excitation-purpose optical fiber 6d. The WDM coupler 218 feeds the pump light of the wavelength $\lambda_1$ to the WDM coupler 212, and feeds the pump light of the wavelength $\lambda_2$ to the WDM coupler 217. The WDM coupler 215 receives the front-pump light (wavelength $\lambda_1$) sent through an excitation-purpose optical fiber 6g, and provides the front-pump light to the input side of the fiber amplifier 211.

In the normal operation mode, the laser diode 113 of the terminal station 1 is not used, so that the fiber amplifier 216 of the remote amplifier 2F is not put in an excitation state. During the time of fault localization, the OTDR 310 of FIG. 3B is used as follows.

In the terminal station 1, the receiving unit 313 of the OTDR 310 is installed in place of the optical-signal receiving unit 111, and the sending unit 312 of the OTDR 310 is connected to the node 116 of the localization-purpose transmission line 6f. The sending unit 312 transmits a light pulse for fault localization having the same wavelength $\lambda_0$ as the signal light. The light pulse for fault localization is sent to the remote amplifier 2F via the localization-purpose transmission line 6f, and is amplified by the fiber amplifier 216. Then, the light pulse for fault localization is transmitted to the receiving-purpose optical fiber 6b' after passing through the WDM coupler 217 and the optical coupler 214. The reflected and scattered light coming back from the fault point 350 of the receiving-purpose optical fiber 6b' passes through the optical coupler 214 and the WDM coupler 215, and is amplified by the fiber amplifier 211. Then, the reflected and scattered light travels through the WDM coupler 212, the optical isolator 213, and the receiving-purpose optical fiber 6b to finally reach the terminal station 1. The receiving unit 313 of the OTDR 310 detects the reflected and scattered light.

The use of the remote amplifiers described above makes it possible to localize a fault point from the terminal stations even when the fault point is located beyond the remote amplifiers. Namely, the fault localization of the related art can be used when the fault point is located between a terminal station and a remote amplifier, and the fault localization of the present invention can be used when the fault point is located between the remote amplifiers.

Figure 19:
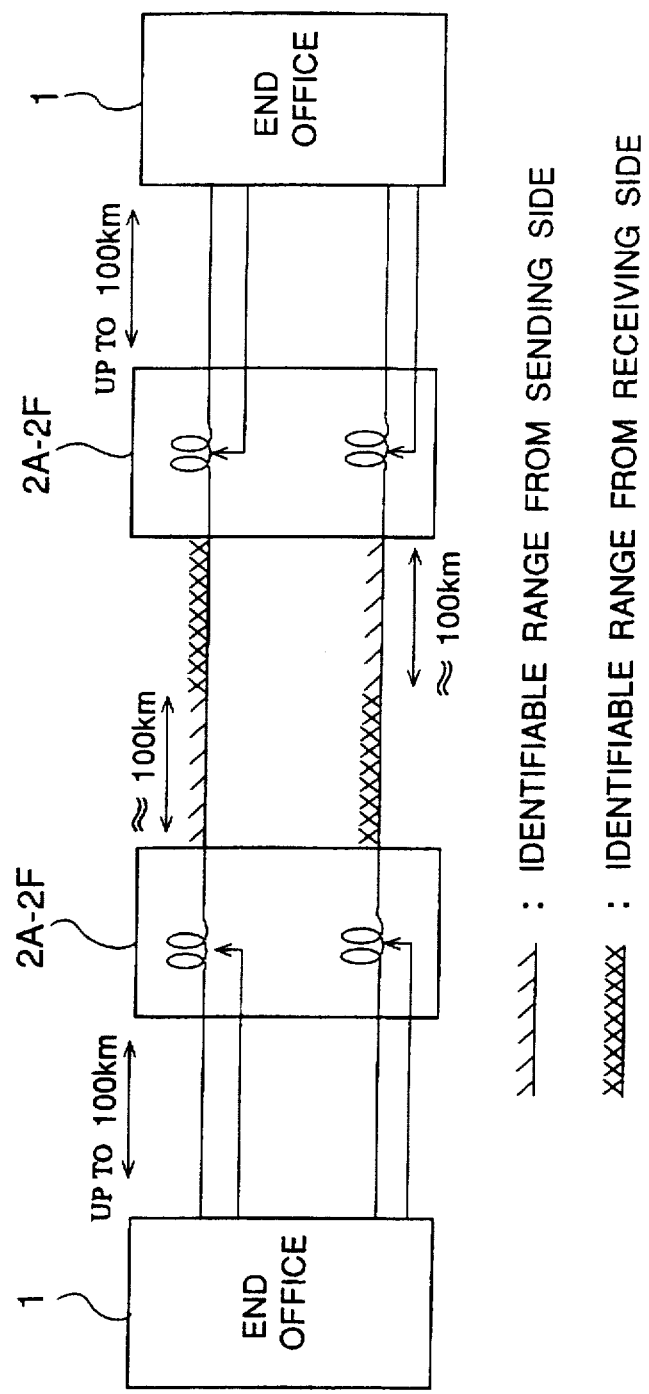
FIG. 19 is an illustrative drawing showing ranges where a fault-point can be identified.

FIG. 19 is an illustrative drawing showing ranges where a fault-point can be identified. When the fault-point is located on a sending-purpose optical fiber within the 100-km range beyond a remote amplifier, any one of the remote amplifiers 2A through 2D or its variation can be used for detecting the fault point. In FIG. 19, this 100-km range is shown by hatches provided on a solid line representing the optical fiber. When the fault-point is located on a receiving-purpose optical fiber within the 100-km range beyond a remote amplifier, one of the remote amplifiers 2E and 2F or its variation can be used for detecting the fault point. In FIG. 19, this 100-km range is shown by crosses provided on a solid line representing the optical fiber.

In this manner, according to the present invention, all ranges of the optical-fiber cable can be covered by the fault localization in the repeaterless transmission system using remote amplifiers.

Further, the present invention is not limited to these embodiments, but various variations and modifications may be made without departing from the scope of the present invention.

What is claimed is:

1. A device for receiving input signal light and pump light from a first remote site through a first optical fiber and a second optical fiber, respectively, and for sending amplified signal light through a third optical fiber to a second remote site, said device comprising:

amplifier means for amplifying said input signal light by using said pump light to transmit said amplified signal light to said third optical fiber, said amplifier means having prevention means for preventing light coming back through said third optical fiber from entering said amplifier means; and path providing means for providing a path inside said device, said path leading reflection light coming through said third optical fiber to a connection point of said device, said connection point having optical connection with said first remote site, wherein said reflection light is a light pulse for fault localization reflected at a fault point on said third optical fiber, said light pulse for fault localization sent to said third optical fiber from said first remote site via said device.

2. The device as claimed in claim 1, wherein said optical connection is provided by a fourth optical fiber extending from said first remote site, and said path receives said light pulse for fault localization from said first remote site via said fourth optical fiber.

3. The device as claimed in claim 1, wherein said optical connection is provided by a fourth optical fiber extending from said first remote site, and said amplifier means receives said light pulse for fault localization through said first optical fiber.

4. The device as claimed in claim 1, wherein said optical connection is provided by said second optical fiber, and said amplifier means receives said light pulse for fault localization through said first optical fiber.

5. The device as claimed in claim 1, wherein said optical connection is provided by said first optical fiber, and said amplifier means receives said light pulse for fault localization through said first optical fiber.

6. The device as claimed in claim 5, further comprising another amplifying means for amplifying said reflection light along said path.

7. The device as claimed in claim 1, further comprising another amplifying means for receiving another pump light from said first remote site and another input signal light from said second remote site to send another amplified signal light to said first remote site through a fifth optical fiber, wherein said optical connection is provided by said fifth optical fiber, and said connection point is at an input side of said another amplifying means.

8. The device as claimed in claim 1, further comprising another amplifying means for receiving another pump light from said first remote site and another input signal light from said second remote site to send another amplified signal light to said first remote site through a fifth optical fiber, wherein said optical connection is provided by said fifth optical fiber, and said connection point is at an output side of said another amplifying means.

9. A device for receiving pump light from a first remote site through a first optical fiber and input signal light from a second remote site through a second optical fiber and for sending amplified signal light to said first remote site through a third optical fiber, said device comprising:

amplifier means for amplifying said input signal light by using said pump light to transmit said amplified signal light to said third optical fiber, said amplifier means having prevention means for preventing light coming back through said third optical fiber from entering said amplifier means; and path providing means for providing a path inside said device, said path receiving a light pulse for fault localization sent from said first remote site at a connection point and leading said light pulse for fault localization to said second optical fiber, said connection point having optical connection with said first remote site, wherein reflection light of said light pulse for fault localization reflected at a fault point on said second optical fiber is received by said amplifier means to be sent to said first remote site via said third optical fiber.

10. The device as claimed in claim 9, wherein said optical connection is provided by a fourth optical fiber.

11. The device as claimed in claim 9, further comprises another amplifier means for amplifying said light pulse for fault localization along said path.

12. A device for receiving first input signal light and first pump light from a first remote site to send first amplified signal light through a first optical fiber to a second remote site, and for receiving second pump light from said first remote site and second input signal light through a second optical fiber from said second remote site to send second amplified signal light through a third optical fiber to said first remote site, said device comprising:

first amplifier means for amplifying said first input signal light by using said first pump light to transmit said first amplified signal light to said first optical fiber, said first amplifier means having prevention means for preventing light coming through said first optical fiber from entering said first amplifier means;

first path providing means for providing a first path inside said device for reflection light coming through said first optical fiber, said first path leading said reflection light to a fourth optical fiber connected between said device and said first remote site;

second amplifier means for amplifying said second input signal light by using said second pump light to transmit said second amplified signal light to said third optical fiber, said second amplifier means having prevention means for preventing light coming through said third optical fiber from entering said second amplifier means; and second path providing means for providing a second path inside said device for a light pulse for fault localization sent from said first remote site, said second path leading said light pulse for fault localization to said second optical fiber.

13. A method of localizing a remote fault point on a first optical fiber from a local site in a transmission system where a remote amplifier receives input signal light from said local site through a second optical fiber and pump light from said local site through a third optical fiber to output amplified signal light to said first optical fiber, said remote amplifier allowing only one-way passage of light from said local site to said first optical fiber; said method comprising the steps of:

a) providing a path within said remote amplifier, said path allowing passage of light from said first optical fiber to a point which has optical connection with said local site;

b) sending a fault-localization signal from said local site to said first optical fiber via said remote amplifier; and c) detecting, at said local site, reflected light of said fault-localization signal reflected at said remote fault point on said first optical fiber, said reflected light coming back through said first optical fiber, said path, and said optical connection.

14. The method as claimed in claim 13, further comprising a step of providing said optical connection via a fourth optical fiber, wherein said step b) sends said fault-localization signal to said first optical fiber via said fourth optical fiber and said path.

15. The method as claimed in claim 13, further comprising a step of providing said optical connection via a fourth optical fiber, wherein said step b) sends said fault-localization signal to said first optical fiber via said second optical fiber and said remote amplifier.

16. The method as claimed in claim 13, further comprising a step of providing said optical connection via said third optical fiber, wherein said step b) sends said fault-localization signal to said first optical fiber via said third optical fiber and said path.

17. The method as claimed in claim 13, further comprising a step of providing said optical connection via said third optical fiber, wherein said step b) sends said fault-localization signal to said first optical fiber via said second optical fiber and said remote amplifier.

18. The method as claimed in claim 13, further comprising a step of providing said optical connection via said second optical fiber, wherein said step b) sends said fault-localization signal to said first optical fiber via said second optical fiber and one of said remote amplifier and said path.

19. The method as claimed in claim 13, further comprising a step of providing said optical connection via a fifth optical fiber, said fifth optical fiber being used by said remote amplifier when said remote amplifier receives another input signal light from a remote site and sends another amplified signal light to said local site, wherein said step b) sends said fault-localization signal to said first optical fiber via said second optical fiber and said remote amplifier.

20. A method of localizing a remote fault point on a first optical fiber from a local site in a transmission system where a remote amplifier receives input signal light through said first optical fiber and pump light from said local site through a second optical fiber to send amplified signal light to said local site through a third optical fiber, said remote amplifier allowing only one-way passage of light from said first optical fiber to said local site; said method comprising the steps of:

a) providing a path within said remote amplifier, said path allowing passage of light from a point having optical connection with said local site to said first optical fiber;

b) sending a fault-localization signal from said local site to said first optical fiber via said optical connection and said path; and c) detecting, at said local site, reflected light of said fault-localization signal reflected at said remote fault point on said first optical fiber, said reflected light coming back through said first optical fiber, said remote amplifier, and said third optical fiber.

* * * * *